(12) United States Patent
Ukei et al.

(10) Patent No.: US 7,799,853 B2
(45) Date of Patent: *Sep. 21, 2010

(54) ADHESIVE COMPOSITION, ADHESIVE SHEET, AND SURFACE PROTECTIVE FILM

(75) Inventors: Natsuki Ukei, Ibaraki (JP); Tatsumi Amano, Ibaraki (JP); Masahiko Ando, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/065,652

(22) PCT Filed: Sep. 5, 2006

(86) PCT No.: PCT/JP2006/317522

§ 371 (c)(1),
(2), (4) Date: Mar. 4, 2008

(87) PCT Pub. No.: WO2007/029681

PCT Pub. Date: Mar. 15, 2007

(65) Prior Publication Data

US 2009/0163626 A1   Jun. 25, 2009

(30) Foreign Application Priority Data

Sep. 5, 2005   (JP) .............................. 2005-256352

(51) Int. Cl.
| | |
|---|---|
| C08K 5/34 | (2006.01) |
| C08K 5/3435 | (2006.01) |
| C08K 5/35 | (2006.01) |
| C08G 73/10 | (2006.01) |
| B32B 7/12 | (2006.01) |
| B32B 15/04 | (2006.01) |
| C08G 63/00 | (2006.01) |
| C08F 118/02 | (2006.01) |
| C08F 18/00 | (2006.01) |
| C08F 120/18 | (2006.01) |
| C08F 20/06 | (2006.01) |
| C08F 20/44 | (2006.01) |
| C08F 120/06 | (2006.01) |
| C08F 220/06 | (2006.01) |
| C08F 220/46 | (2006.01) |

(52) U.S. Cl. ........................... 524/99; 524/95; 524/104; 524/106; 428/343; 528/271; 526/319; 526/320; 526/329.7; 526/931; 526/317.1

(58) Field of Classification Search .................. 524/95, 524/96, 98, 99, 100; 526/319, 320, 317.1, 526/931

See application file for complete search history.

(56) References Cited

U.S. PATENT DOCUMENTS

| | | |
|---|---|---|
| 3,492,276 A | 1/1970 | Smith |
| 4,145,327 A | 3/1979 | Dolch et al. |
| 5,183,841 A | 2/1993 | Bernard |
| 5,296,627 A | 3/1994 | Tang et al. |
| 5,433,892 A | 7/1995 | Czech |
| 5,631,079 A | 5/1997 | Gutman et al. |
| 5,885,678 A | 3/1999 | Malhotra |
| 5,952,398 A | 9/1999 | Dietz et al. |
| 6,028,132 A | 2/2000 | Hayashi |
| 6,103,316 A | 8/2000 | Tran et al. |
| 6,245,847 B1 | 6/2001 | Green et al. |
| 6,372,829 B1 | 4/2002 | Lamanna et al. |
| 6,407,788 B1 | 6/2002 | Okumura et al. |
| 6,518,342 B1 * | 2/2003 | Tanaka et al. ................ 524/270 |
| 6,657,011 B2 | 12/2003 | Lau et al. |
| 6,706,920 B2 | 3/2004 | Lamanna et al. |
| 6,939,911 B2 | 9/2005 | Tosaki et al. |
| 7,491,758 B2 * | 2/2009 | Amano et al. ................. 524/99 |
| 7,691,925 B2 * | 4/2010 | Amano et al. ................. 524/99 |
| 2001/0031835 A1 | 10/2001 | Ohrui et al. |
| 2001/0041763 A1 | 11/2001 | Suzuki et al. |
| 2002/0037413 A1 * | 3/2002 | Kishioka et al. ............ 428/412 |
| 2002/0132111 A1 | 9/2002 | Zhou et al. |
| 2002/0137825 A1 * | 9/2002 | Lamanna et al. ............ 524/243 |
| 2003/0114560 A1 | 6/2003 | Yang et al. |
| 2004/0054041 A1 * | 3/2004 | Schmidt ....................... 524/99 |
| 2005/0025903 A1 | 2/2005 | Fink et al. |
| 2005/0080195 A1 | 4/2005 | Iwama |
| 2005/0197450 A1 | 9/2005 | Amano et al. |
| 2005/0266238 A1 | 12/2005 | Amano et al. |
| 2006/0024494 A1 | 2/2006 | Amano et al. |
| 2006/0100323 A1 * | 5/2006 | Schmidt et al. ............. 524/106 |
| 2006/0188711 A1 * | 8/2006 | Kishioka et al. ............ 428/343 |

(Continued)

FOREIGN PATENT DOCUMENTS

EP   0 435 080   7/1991

(Continued)

OTHER PUBLICATIONS

Brochure regarding "Functional Chemicals" published by Kyoeisha Chemical Co., LTD., printed and published in May 2003, front page, pp. 11-12, 19-20 and back page.

(Continued)

*Primary Examiner*—Vasu Jagannathan
*Assistant Examiner*—Anthony H Sheh
(74) *Attorney, Agent, or Firm*—Knobbe Martens Olson & Bear LLP

(57) ABSTRACT

Disclosed is a pressure sensitive adhesive composition characterized by containing an ionic liquid and a polymer which contains, as a monomer unit, 0.1-10% by weight of a (meth) acrylate with a hydroxyalkyl group having 3-12 carbon atoms. The present invention provides a pressure sensitive adhesive composition which is excellent in antistatic property of a no-electrification-prevented adherend upon peeling, and has reduced staining of an adherend and is excellent in adhesion reliance. Also disclosed is an antistatic pressure sensitive adhesive sheet or surface-protecting film prepared using the composition. Also disclosed is an antistatic pressure sensitive adhesive sheet or surface-protecting film prepared using the composition.

15 Claims, 1 Drawing Sheet

U.S. PATENT DOCUMENTS

| | | |
|---|---|---|
| 2006/0207722 A1 | 9/2006 | Amano et al. |
| 2007/0141329 A1 | 6/2007 | Yang et al. |
| 2007/0149650 A1 | 6/2007 | Masuda |
| 2008/0176976 A1 | 7/2008 | Amano et al. |
| 2009/0029162 A1 | 1/2009 | Ukei et al. |
| 2009/0317635 A1 | 12/2009 | Amano et al. |

FOREIGN PATENT DOCUMENTS

| | | |
|---|---|---|
| EP | 684295 A1 * | 11/1995 |
| EP | 0 873 986 | 10/1998 |
| EP | 919603 A1 * | 6/1999 |
| EP | 1 102 108 | 5/2001 |
| EP | 1 491 604 | 12/2004 |
| EP | 1 548 750 | 6/2005 |
| EP | 1 574 557 | 9/2005 |
| EP | 1 591 506 | 11/2005 |
| EP | 1 595 929 | 11/2005 |
| EP | 1 602 698 | 12/2005 |
| EP | 1 621 596 | 2/2006 |
| GB | 2121061 | 12/1983 |
| JP | 59-226076 | 12/1984 |
| JP | 61-138901 | 6/1986 |
| JP | 4-309585 | 11/1992 |
| JP | 5-009449 | 1/1993 |
| JP | 6-051121 | 2/1994 |
| JP | 6-128539 | 5/1994 |
| JP | 9-157618 | 6/1997 |
| JP | 9-165460 | 6/1997 |
| JP | 9-208910 | 8/1997 |
| JP | 10-231325 | 9/1998 |
| JP | 10-298539 | 11/1998 |
| JP | 11-256116 | 9/1999 |
| JP | 11-349910 | 12/1999 |
| JP | 2000-129235 | 5/2000 |
| JP | 2001-209039 | 8/2001 |
| JP | 2001-318230 | 11/2001 |
| JP | 2002-022960 | 1/2002 |
| JP | 2002-544364 | 12/2002 |
| JP | 2003-511505 | 3/2003 |
| JP | 2003-195044 | 7/2003 |
| JP | 2003-202722 | 7/2003 |
| JP | 2003-268334 | 9/2003 |
| JP | 2003-342483 | 12/2003 |
| JP | 2004-517185 | 6/2004 |
| JP | 2004-217931 | 8/2004 |
| JP | 2004-287199 | 10/2004 |
| JP | 2004-536940 | 12/2004 |
| JP | 2005-15524 | 1/2005 |
| JP | 2005-105228 | 4/2005 |
| JP | 2005-206776 | 8/2005 |
| JP | EP 1 582 573 | 10/2005 |
| WO | WO 97/08260 | 3/1997 |
| WO | WO 98/36005 | 8/1998 |
| WO | WO 00/24839 | 5/2000 |
| WO | WO 00/69985 | 11/2000 |
| WO | WO 01/25326 | 4/2001 |
| WO | WO 02/13980 | 2/2002 |
| WO | WO 02/053636 | 7/2002 |
| WO | WO 03/011958 | 2/2003 |
| WO | WO 03/068280 | 8/2003 |
| WO | WO 03/085050 | 10/2003 |
| WO | WO 03/099953 | 12/2003 |
| WO | WO 2004/005391 | 1/2004 |
| WO | WO 2004005391 A1 * | 1/2004 |
| WO | WO 2004/027788 | 4/2004 |
| WO | WO 2004/065523 A1 | 8/2004 |
| WO | WO 2005/061627 | 7/2005 |

OTHER PUBLICATIONS

European Office Action issued on the related European Patent Application No. EP05016102.5, dated Apr. 16, 2007.
European Search Report issued on the related European Patent Application No. EP05011720.9, dated Sep. 30, 2005.
European Search Report issued on the related European Patent Application No. EP05016102.5, dated Dec. 29, 2005.
European Search Report issued on the related European Patent Application No. EP06110235.6, dated May 25, 2007.
European Search Report issued on the related European Patent Application No. EP05004925, dated Oct. 24, 2005.
European Search Report issued on the related European Patent Application No. EP06111107, dated Jun. 27, 2006.
European Search Report issued on the related European Patent Application No. 05005660, dated Jun. 30, 2005.
European Search Report issued on the related European Patent Application No. 05020138, dated Nov. 28, 2005.
European Search Report issued on the related European Patent Application No. 05009331, dated Jul. 22, 2005.
European Search Report issued on the related European Patent Application No. 05004925, dated Aug. 19, 2005.
European Search Report issued on the related European Patent Application No. 05020102, dated Nov. 29, 2005.
European Search Report issued on the related European Patent Application No. 05010330, dated Sep. 19, 2005.
European Search Report issued on the related European Patent Application No. 05015766, dated Nov. 4, 2005.
European Search Report issued on the related European Patent Application No. 05016102, dated Nov. 8, 2005.
File History of the related U.S. Appl. No. 11/073,456, as of Apr. 3, 2008.
File History of the related U.S. Appl. No. 11/141,590, as of Apr. 3, 2008.
File History of the related U.S. Appl. No. 11/188,561, as of Apr. 3, 2008.
File History of the related U.S. Appl. No. 11/358,808, as of Apr. 3, 2008.
File History of the related U.S. Appl. No. 11/375,963, as of Apr. 3, 2008.
File History of the related U.S. Appl. No. 11/914,939, as of Apr. 3, 2008.
File History of the related U.S. Appl. No. 12/052,951, as of Apr. 3, 2008.
Information Supplement filed on the related Japanese Patent Application No. 2005-26704, dated May 14, 2007.
International Search Report issued on the related PCT Application No. PCT/JP2006/309712, dated Jun. 20, 2006.
International Search Report issued on the corresponding PCT Application No. PCT/JP2006/317522, dated Dec. 12, 2006.
Partial European Search Report issued on the related European Patent Application No. EP05016102, dated Nov. 8, 2005.
Peter Wasserscheid et al., "Ionic Liquids—New "Solutions" for Transition Metal Catalysis," Angewandte Chemie. International Edition, Verlag Chemie. Weinheim, Germany, vol. 39, No. 21, Nov. 3, 2000.
File History of the related U.S. Appl. No. 11/073,456, for the period of Apr. 4, 2008-Aug. 17, 2009.
File History of the related U.S. Appl. No. 11/141,590, for the period of Apr. 4, 2008-Aug. 17, 2009.
File History of the related U.S. Appl. No. 11/188,561, for the period of Apr. 4, 2008-Aug. 17, 2009.
File History of the related U.S. Appl. No. 11/375,963, for the period of Apr. 4, 2008-Aug. 17, 2009.
File History of the related U.S. Appl. No. 11/914,939, for the period of Apr. 4, 2008-Aug. 17, 2009.
File History of the related U.S. Appl. No. 12/052,951, for the period of Apr. 4, 2008-Aug. 17, 2009.
File History of the related U.S. Appl. No. 11/188,561, for the period of Aug. 18, 2009-Sep. 2, 2009.

File History of the related U.S. Appl. No. 12/548,318 as of Sep. 2, 2009.

Hans-Georg Elias: "Makromoleküle Band 1 Grundlagen Struktur-Synthese-Eigenschaften", Hüthig & Wepf Verlag, Basel Heidelberg New York, pp. 845-857 (1990).

M.D. Lechner, K. Gehrke, E.H. Nordmeier: "Makromolekulare Chemie-Ein Lehrbuch für Chemiker, Physiker, Materialwissenschaftler und Verfahrenstechniker" Birkhäser Verlag, Basel Boston Berlin, pp. 295-299 (1996).

File History of the related U.S. Appl. No. 11/073,456, for the period of Aug. 18, 2009-Feb. 10, 2010.

File History of the related U.S. Appl. No. 11/188,561, for the period of Sep. 3, 2009-Feb. 10, 2010.

File History of the related U.S. Appl. No. 11/375,963, for the period of Aug. 18, 2009-Feb. 10, 2010.

File History of the related U.S. Appl. No. 12/052,951, for the period of Aug. 18, 2009-Feb. 10, 2010.

File History of the related U.S. Appl. No. 12/548,318, for the period of Sep. 3, 2009-Feb. 10, 2010.

\* cited by examiner

Schematic view of an electrostatic measuring part

ADHESIVE COMPOSITION, ADHESIVE SHEET, AND SURFACE PROTECTIVE FILM

This application is the U.S. National Phase under 35 U.S.C. §371 of International Application No. PCT/JP2006/317522, filed Sep. 5, 2006, which claims priority to the Japanese Patent Application No. 2005-256352, filed Sep. 5, 2005. The International Application was not published in English under PCT Article 21(2).

TECHNICAL FIELD

The present invention relates to a pressure sensitive adhesive composition having antistatic property, and pressure sensitive adhesive sheets obtained by formulating into a form of a sheet or a tape using the composition.

Pressure sensitive sheets comprising an antistatic pressure sensitive adhesive composition of the present invention is suitably used in plastic products on which static electricity is easily generated. Above all, particularly, the pressure sensitive adhesive sheet is useful as antistatic releasable pressure sensitive adhesive sheet or antistatic releasable pressure sensitive adhesive tape used for avoiding static electricity in an electronic instrument and the like.

Examples of releasable adhesive sheets and releasable adhesive tapes include masking tapes such as masking tapes for building curing, masking tapes for automobile painting, masking tapes for electronic components (such as lead frames and printed boards), and masking tapes for sandblasting; surface-protecting films such as surface-protecting films for aluminum sashes, surface-protecting films for optical plastics, surface-protecting films for optical glass products, surface-protecting films for automobile protection, and surface-protecting films for metal plates; adhesive tapes for use in semiconductor and electronic component processes, such as back grinding tapes, pellicle fixing tapes, dicing tapes, lead frame fixing tapes, cleaning tapes, dust removing tapes, carrier tapes, and cover tapes; tapes for packing electronic devices or electronic components; tapes for temporary bonding during transportation; binding tapes; and labels.

BACKGROUND ART

A surface-protecting film is generally stuck to subject to be protected with pressure sensitive adhesive applied on the side of the protecting film, and used for the purpose of preventing scratches or staining caused during processing or conveyance of the subject to be protected. For example, a liquid crystal display panel is formed by sticking optical members such as a polarizing plate and a wavelength plate to a liquid crystal cell with pressure sensitive adhesive. The protecting film is stuck to these optical members stuck to the liquid crystal cell with pressure sensitive adhesive for the purpose of preventing scratches, staining and the like.

Then, the protecting film is removed by peeling off at the stage when the protecting film becomes unnecessary, for example, this optical member is stuck to the liquid crystal cell. Generally, the protecting film and the optical member are composed of plastic materials, so that electrical insulating property is high and static electricity is caused during friction and peeling off. Therefore, even when the protecting film is peeled off from the optical member such as polarizing plates, static electricity is generated. If the generated static electricity remains when a voltage is applied to the liquid crystal, the liquid crystal molecule can be out of alignment, or the panel can be damaged. Thus, in order to prevent such defects, various antistatic treatments are applied to the surface-protecting film.

For example, a method of preventing electrification by adding one kind or more of a surfactant to pressure sensitive adhesive to transfer the surfactant from the pressure sensitive adhesive to an adherend is disclosed (for example, refer to Patent Publication 1). However, with regard to this invention, the surfactant bleeds on the surface of the pressure sensitive adhesive so easily that staining on the adherend is concerned in the case of applying to the protecting film. Accordingly, when a pressure sensitive adhesive agent containing a low-molecular weight surfactant is used for optical member-protecting films, sufficient antistatic properties are difficult to provide without degradation of the optical properties of the optical member.

Also, a method of adding an antistatic agent comprising polyether polyol and an alkali metal salt to acrylic pressure sensitive adhesive to restrain the antistatic agent from bleeding on the surface of the pressure sensitive adhesive is disclosed (for example, refer to Patent Publication 2). However, bleeding of the antistatic agent can not be avoided also in this method; consequently, in the case of actually applying to the surface-protecting film, it has proved that treatment with time and under high temperature causes staining on the adherend due to the bleeding phenomenon.

Patent Publication 1: JP-A No. 9-165460
Patent Publication 2: JP-A No. 6-128539

DISCLOSURE OF THE INVENTION

Problems to be Solved by the Invention

In light of the circumstances described above, therefore, the present invention provides a pressure sensitive adhesive composition can prevent the generation of static electricity on the material when peeled off from an adherend which undergoes no antistatic treatment, hardly stains the adherend, and excellent in adhesion reliability, also provides an antistatic adhesive sheet or surface-protecting film prepared using the pressure sensitive adhesive composition.

In order to solve the aforementioned problems, the present inventors intensively studied and, as a result, found out that the aforementioned object can be attained by a pressure sensitive adhesive composition shown below, which resulted in completion of the present invention.

Thus, the pressure sensitive adhesive composition of the invention includes an ionic liquid and a polymer containing, as a monomer unit, 0.1 to 10% by weight of a (meth)acrylate ester with a hydroxyalkyl group having 3 to 12 carbon atoms.

A (meth)acryl-based polymer in the present invention refers to an acryl-based polymer and/or a methacryl-based polymer. The term "(meth)acrylate ester" refers to acrylate ester and/or methacrylate ester, and a (meth)acrylate refers to an acrylate and/or a methacrylate.

The ionic liquid in the present invention refers to a melt salt (ionic compound) exhibiting the liquid state at room temperature (25° C.).

In an embodiment of the present invention, the adhesive composition includes a base polymer containing, as a monomer unit, 0.1 to 10% by weight of a (meth)acrylate ester with a hydroxyalkyl group having 3 to 12 carbon atoms and also includes an ionic liquid. As shown in the results of Examples, therefore, a pressure sensitive adhesive layer produced by crosslinking this composition is excellent in antistatic property of a no-electrification-prevented adherend upon peeling, and has reduced staining of an adherend. Although the reason why the crosslinked product of the adhesive composition described above can produce such characteristics is not clear in detail, it can be considered that the use of the polymer crosslinked through a crosslinking point of the hydroxyl group of the (meth)acrylate ester with an hydroxyalkyl group having 3 to 12 carbon atoms should contribute to well-balanced interaction such as compatibility between the ionic liquid and the base polymer and ionic conductivity so that good antistatic properties and low staining can be achieved at the same time.

The above-mentioned ionic liquid can easily be added and dispersed or dissolved in the pressure sensitive adhesive as compared with a solid salt by reason of being in a liquid state at room temperature. In addition, the ionic liquid never vanishes with time by reason of having no vapor pressure (non-volatility), so that antistatic property is continuously obtained.

The adhesive composition of the invention is also characterized by including the ionic liquid. The ionic liquid used as an antistatic agent is prevented from bleeding so that the adhesive composition can have a high level of adhesion reliability to adherends even over time or at high temperature. Although the reason why the bleeding can be suppressed using the ionic liquid is not clear, the ionic liquid has good electrical conductivity by itself so that antistatic performance can be sufficiently delivered while the contamination of the adherend surface is kept very low.

In the foregoing, it is preferable that the ionic liquid is one or more kinds of a nitrogen-containing onium salt, a sulfur-containing onium salt, and a phosphorus-containing onium salt. In particular, it is preferable that the ionic liquid contains one or more kinds of cations represented by the following general formulas (A) to (E). By an ionic liquids having these cations, further excellent antistatic ability is obtained.

[Chemical formula 1]

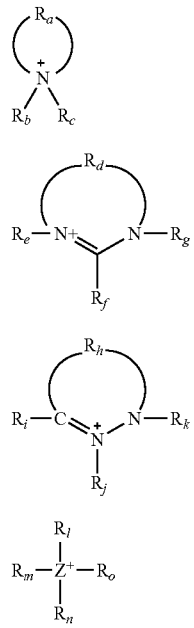

[in the formula (A), $R_a$ represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present]

[in the formula (B), $R_d$ represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom]

[in the formula (C), $R_h$ represents a hydrocarbon group of a carbon number of 2 to 20, and may contain a hetero atom, and $R_i$, $R_j$ and $R_k$ are the same or different, represent a hydrogen or a hydrocarbon group of a carbon number of 1 to 16, and may contain a hetero atom]

[in the formula (D), Z represents a nitrogen atom, a sulfur atom, or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present]

[Chemical formula 2]

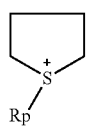

(E)

In Formula (E), $R_p$ represents a hydrocarbon group of a carbon number of 1 to 18, and may contain a hetero atom.

In the adhesive composition of the invention, the present polymer containing, as a monomer unit, 0.1 to 10% by weight of a (meth)acrylate ester with a hydroxyalkyl group having 3 to 12 carbon atoms may be used as a base polymer.

In an embodiment of the invention, the (meth)acrylate ester with a hydroxyalkyl group having 3 to 12 carbon atoms corresponds to an alkyl ester having a hydroxyl group-containing alkyl group having 3 to 12 carbon atoms, and examples of the (meth)acrylate ester include 2-hydroxypropyl (meth)acrylate and 6-hydroxyhexyl (meth)acrylate.

On the other hand, a pressure sensitive adhesive layer of the present invention is characterized by comprising the above-mentioned pressure sensitive adhesive composition crosslinked. A pressure sensitive adhesive sheet more excellent in heat resistance and weather resistance can be obtained by crosslinking while properly adjusting constitutional unit, structural ratio, selection of a crosslinking agent and addition ratio of the above-mentioned (meth)acryl-based polymer.

A pressure sensitive adhesive sheet of the present invention is characterized by forming on a support, and a pressure sensitive adhesive layer comprising the pressure sensitive adhesive composition crosslinked is formed on one side or both sides of a support. A pressure sensitive adhesive sheet of the present invention becomes a pressure sensitive adhesive sheet, in which antistatic property of a pressure sensitive adhesive layer and an adherend to which antistatic treatment is not applied is intended upon peeling off and staining property on the adherend is reduced, by reason of being provided with the pressure sensitive adhesive layer comprising the pressure sensitive adhesive composition for producing the above-mentioned function and effect crosslinked.

Further, when the pressure sensitive adhesive composition of the present invention is applied to a surface-protecting film, it is preferable that a plastic substrate used in a protecting film is antistatic-treated. An antistatic treatment is applied to a plastic substrate, so that peeling electrification voltage of the adherend can be reduced more efficiently to further allow excellent antistatic performance.

BEST MODE FOR CARRYING OUT THE INVENTION

Figure 1:
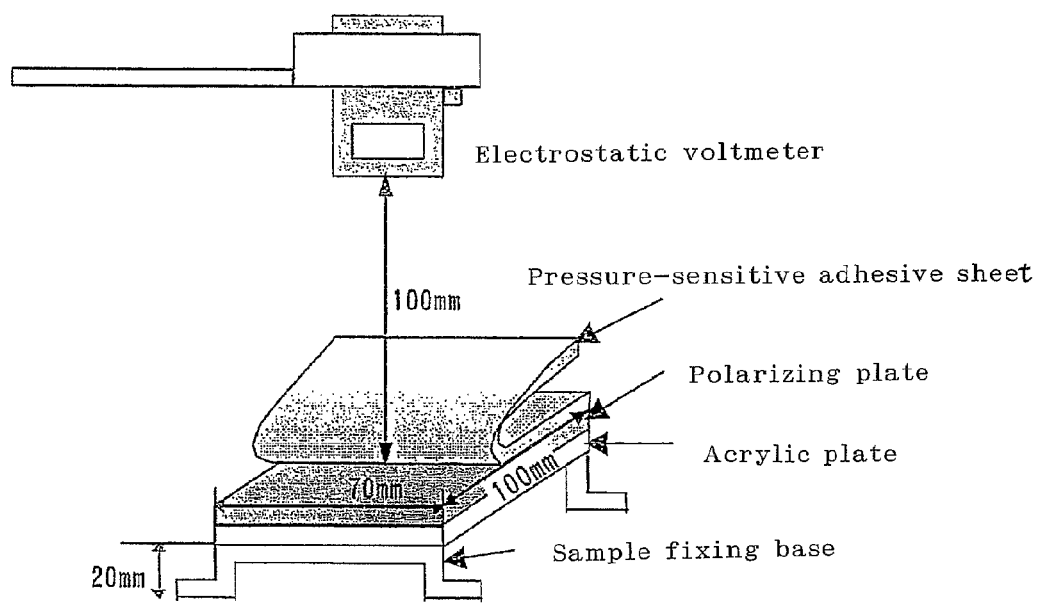
FIG. 1 is a schematic construction view of an electrostatic measuring part used for measuring a peeling electrification voltage in Examples.

The embodiments of the present invention are hereinafter described in detail.

The adhesive composition of the present invention includes an ionic liquid and a polymer containing, as a monomer unit, 0.1 to 10% by weight of a (meth)acrylate ester with a hydroxyalkyl group having 3 to 12 carbon atoms.

In an embodiment of the invention, the polymer containing, as a monomer unit, 0.1 to 10% by weight of a (meth)acrylate ester with a hydroxyalkyl group having 3 to 12 carbon atoms is used as a base polymer.

The polymer used for the present invention is not particularly limited if it is a polymer having adhesive property corresponding to the above.

In an embodiment of the invention, the (meth)acrylate ester with a hydroxyalkyl group having 3 to 12 carbon atoms refers to an alkyl ester with a hydroxyl group-containing alkyl group having 3 to 12 carbon atoms, and examples of the (meth)acrylate ester include alkyl esters each having a hydroxyl group-containing alkyl group having 3 to 12 carbon atoms, such as 2-hydroxypropyl (meth)acrylate, 3-hydroxypropyl (meth)acrylate, 2-hydroxybutyl (meth)acrylate, 4-hydroxybutyl (meth)acrylate, 2-hydroxyhexyl (meth)acrylate, 6-hydroxyhexyl (meth)acrylate, 8-hydroxyoctyl (meth)acrylate, 10-hydroxydecyl (meth)acrylate, and 12-hydroxylauryl (meth)acrylate.

One or more (meth)acrylate esters each having a hydroxyalkyl group having 3 to 12 carbon atoms may be used singly or in combination. The total content of the (meth)acrylate ester monomer in the monomer components in the polymer is preferably from 0.1 to 10% by weight, more preferably from 0.2 to 9% by weight, particularly preferably from 0.3 to 8 parts by weight. If the content of the (meth)acrylate ester monomer unit is less than 0.1% by weight, the monomer unit can tend to be less effective in contributing to well-balanced interaction such as compatibility between the base polymer and the ionic liquid and ionic conductivity. On the other hand, if the content of the (meth)acrylate ester monomer unit is more than 10% by weight, the interaction with the ionic liquid can be so strong that it can tend to be not easy to obtain sufficient antistatic properties.

The polymer for use as a base polymer generally has a glass transition temperature (Tg) of 0° C. or lower, preferably of −100° C. to −5° C., more preferably of −80° C. to −10° C. If the glass transition temperature of the polymer is higher than 0° C., it can be difficult to obtain sufficient adhesive strength in some cases. The glass transition temperature (Tg) of the base polymer may be adjusted as appropriate within the range described above by changing the monomer components to be used or changing the composition ratio.

In particular, a (meth)acrylic polymer mainly comprised of one or more (meth)acrylates each having an alkyl group having 1 to 14 carbon atoms is preferably used so that balanced compatibility with the ionic liquid and good adhesive properties can be obtained.

The (meth)acrylic polymer mainly comprised of one or more (meth)acrylate units having an alkyl group of 1 to 14 carbon atoms preferably includes 60 to 99.9% by weight, more preferably 65 to 98% by weight of one or more (meth)acrylate units having an alkyl group of 1 to 14 carbon atoms.

Examples of (meth)acrylate having an alkyl group of a carbon number of 1 to 14 include methyl (meth)acrylate, ethyl (meth)acrylate, n-butyl (meth)acrylate, s-butyl (meth)acrylate, t-butyl (meth)acrylate, isobutyl (meth)acrylate, hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-undecyl (meth)acrylate, n-dodecyl (meth)acrylate, n-tridecyl (meth)acrylate, and n-tetradecyl (meth)acrylate.

Among them, when used in the surface-protecting film of the present invention, (meth)acrylate having an alkyl group of a carbon number of 6 to 14 such as hexyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, and n-tetradecyl (meth)acrylate is suitably used. By using a (meth)acrylate having an alkyl group of a carbon number of 6 to 14, it becomes easy to control a pressure sensitive adhesive strength to an adherend low, and excellent re-peelability is obtained.

Other polymerizable monomer components that may be used as long as the effects of the invention are not reduced include polymerizable monomers for controlling the glass transition temperature (Tg) or releasability of the (meth)acrylic polymer, which may be used to make the Tg 0° C. or lower (generally −100° C. or higher) so that the adhesive property balance can be easily maintained.

Examples of other polymerizable monomers that may be used as appropriate for the (meth)acrylic polymer also include cohesive property or heat resistance enhancing components such as sulfonic acid group-containing monomers, phosphoric acid group-containing monomers, cyano group-containing monomers, vinyl esters, and aromatic vinyl compounds; and adhesive strength enhancing components or components with a functional group serving as a crosslinking point, such as carboxyl group-containing monomers, acid anhydride group-containing monomers, amide group-containing monomers, amino group-containing monomers, imide group-containing monomers, epoxy group-containing monomers, (meth)acryloyl morpholine, and vinyl ethers. Any one of these monomer compounds may be used alone, or two or more of these monomer compounds may be used in any combination.

When acid functional group-containing (meth)acrylates such as carboxyl group-containing monomers, acid anhydride group-containing monomers and phosphoric acid group-containing monomers are used, the acid value of the (meth)acrylic polymer should preferably adjusted to 29 or less. In particular, it should preferably adjusted to 1 or less in view of antistatic property and staining on the adherend is reduced. If the acid value of the (meth)acrylic polymer is more than 29, the antistatic properties can tend to be low.

The adjustment of an acid value can be performed by the blending amount of a (meth)acrylate having an acid functional group, and examples of the (meth)acryl-based polymer having a carboxyl group include a (meth)acryl-based polymer obtained by copolymerizing 2-ethylhexyl acrylate and acrylic acid, and in this case, the acid value can be brought to a value of 29 or less by adjusting acrylic acid to 3.7 parts by weight or less with respect to 100 parts by weight of the total of 2-ethylhexyl acrylate and acrylic acid.

Examples of the sulfonic acid group-containing monomer include styrenesulfonic acid, allylsulfonic acid, 2-(meth)

acrylamido-2-methylpropanesulfonic acid, (meth)acrylamidopropanesulfonic acid, sulfopropyl (meth)acrylate, (meth)acryloyloxynaphthalenesulfonic acid, and sodium vinylsulfonate.

Examples of the phosphoric acid-group-containing monomer include 2-hydroxyethylacryloyl phosphate.

Examples of the cyano group-containing monomer include acrylonitrile and methacrylonitrile.

Examples of vinylesters include vinyl acetate, vinyl propionate, and vinyl laurate.

Examples of the aromatic vinyl compound include styrene, chlorostyrene, chloromethylstyrene, α-methylstyrene, and other substituted styrene.

Examples of the carboxyl group-containing monomer include acrylic acid methacrylic acid, carboxyethyl (meth) acrylate, carboxypentyl (meth)acrylate, itaconic acid, maleic acid, fumaric acid, crotonic acid. In particular, acrylic acid and methacrylic acid are preferably used.

Examples of the acid anhydride group-containing monomer include maleic acid anhydride, itaconic acid anhydride, and an acid anhydride of the aforementioned carboxyl group-containing monomer.

Examples of the amido group-containing monomer include acrylamide, methacrylamide, diethylacrylamide, N-vinylpyrrolidone, N,N-dimethylacrylamide, N,N-dimethylmethacrylamide, N,N-diethylacrylamide, N,N-diethylmethacrylamide, N,N'-methylenebisacrylamide, N,N-dimethylaminopropylacrylamide, N,N-dimethylaminopropylmethacrylamide, and diacetone acrylamide.

Examples of the amino group-containing monomer include aminoethyl (meth)acrylate, N,N-dimethylaminoethyl (meth)acrylate, and N,N-dimethylaminopropyl (meth) acrylate.

Examples of the imide group-containing monomer include cyclohexylmaleimide, isopropylmaleimide, N-cyclohexylmaleimide, and itaconeimide.

Examples of the epoxy group-containing monomer include glycidyl (meth)acrylate, methylglycidyl (meth)acrylate, and allyl glycidyl ether.

Examples of vinyl ethers include methyl vinyl ether, ethyl vinyl ether, and isobutyl vinyl ether.

In the present invention, the above-mentioned other polymerizable monomer components may be used singly or by mixture of two kinds or more, and yet the content thereof in total is preferably 0 to 39.9% by weight, more preferably 0 to 35% by weight and particularly preferably 0 to 30% by weight in the total monomer components of the (meth)acryl-based polymer. The use of the other polymerizable monomer components allows favorable interaction with the ionic liquid and favorable adhesive property to be properly adjusted.

As a monomer component of the (meth)acrylic polymer used in the present, an alkylene oxide group-containing reactive monomer is preferably contained as appropriate. If the (meth)acrylic polymer containing an alkylene oxide group-containing reactive monomer as a monomer unit is used as a base polymer, an appropriate adjustment can be performed to achieve favorable interaction with the ionic liquid and favorable adhesive property.

The oxyalkylene group of the alkylene oxide group-containing monomer may have an alkylene group having 1 to 6 carbon atoms, and examples of such an oxyalkylene group include oxymethylene, oxyethylene, oxypropylene, and oxybutylene. The hydrocarbon group of the oxyalkylene chain may be straight or branched.

The average oxyalkylene unit addition mole number of the alkylene oxide group-containing reactive monomer (the average molar number of oxyalkylene units added in the alkylene oxide group-containing reactive monomer) is preferably from 3 to 40, more preferably from 4 to 35, particularly preferably from 5 to 30, in view of compatibility with the ionic liquid. If the average addition mole number is 3 or more, good interaction with the ionic liquid can be obtained, and the adhesive property can be easy to control. If the average addition mole number is 40 or more, the interaction with the ionic liquid can be so strong that sufficient antistatic properties can tend to be difficult to achieve. The end of the oxyalkylene chain may be maintained as a hydroxyl group or substituted with any other functional group.

The alkylene oxide group-containing reactive monomer is preferably an ethylene oxide group-containing reactive monomer. If a (meth)acrylic polymer containing an ethylene oxide group-containing monomer unit is used as a base polymer, the base polymer can have improved compatibility with the ionic liquid so that low staining compositions from which bleeding to adherends is well suppressed can be obtained.

Examples of the alkylene oxide group-containing reactive monomer in the present invention may be a (meth)acrylic acid alkylene oxide adduct or a reactive surfactant having a reactive substituent such as (meth)acryloyl or allyl in its molecule.

Specific examples of the (meth)acrylic acid alkylene oxide adduct for use in the invention include polyethylene glycol (meth)acrylate, polypropylene glycol (meth)acrylate, polyethylene glycol-polypropylene glycol (meth)acrylate, polyethylene glycol-polybutylene glycol (meth)acrylate, polypropylene glycol-polybutylene glycol (meth)acrylate, methoxypolyethylene glycol (meth)acrylate, ethoxypolyethylene glycol (meth)acrylate, butoxypolyethylene glycol (meth)acrylate, octoxypolyethylene glycol (meth)acrylate, lauroxypolyethylene glycol (meth)acrylate, stearoxypolyethylene glycol (meth)acrylate, phenoxypolyethylene glycol (meth)acrylate, methoxypolypropylene glycol (meth)acrylate, and octoxypolyethylene glycol-polypropylene glycol (meth)acrylate.

Specific examples of the reactive surfactant having an alkylene oxide group include reactive anionic surfactants, reactive nonionic surfactants and reactive cationic surfactants each having a (meth)acryloyl or allyl group.

A single type or two or more types of alkylene oxide group-containing reactive monomers may be used alone or in combination. The total content of the alkylene oxide group-containing reactive monomer in the monomer components of the (meth)acrylic polymer is preferably from 0 to 4.9% by weight, more preferably from 0 to 4% by weight, particularly preferably from 0 to 3% by weight. If the content of the alkylene oxide group-containing reactive monomer unit is more than 4.9% by weight, the ionic liquid can be strongly arrested by the polymer so that it can be sometimes undesirably difficult to achieve sufficient antistatic properties.

The acrylic polymer for use in the present invention preferably has a weight average molecular weight of 100,000 to 5,000,000, more preferably of 200,000 to 4,000,000, still more preferably of 300,000 to 3,000,000. If the weight average molecular weight is less than 100,000, the cohesive strength of the adhesive composition can be so low that adhesive deposition can tend to occur. If the weight average molecular weight is more than 5,000,000, the flowability of the polymer can be reduced so that wetting of polarizing plates can be insufficient, which can tend to cause peeling. The weight-average molecular weight is a molecular weight obtained by measurement by GPC (gel permeation chromatography).

The production of the (meth)acryl-based polymer is not particularly limited, for example, a known polymerization method can be appropriately selected, examples thereof including solution polymerization, emulsion polymerization, bulk polymerization, and suspension polymerization. The resultant polymer may be any one selected from a random copolymer, a block copolymer, an alternate copolymer, a graft copolymer, and others.

The adhesive composition of the present invention also includes an ionic liquid. The ionic liquid in the present invention refers to a melt salt (ionic compound) exhibiting the liquid state at room temperature (25° C.).

As the ionic liquid, a nitrogen-containing onium salt, a sulfur-containing onium salt or a phosphorus-containing onium salt is preferably used. In particular, since excellent antistatic ability is obtained, an ionic liquid comprising an organic cation component represented by the following general formulas (A) to (E), and an anion component is preferably used.

[Chemical formula 3]

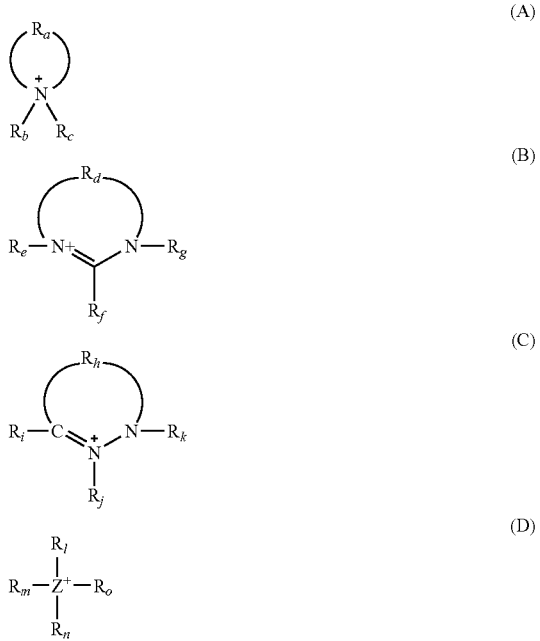

[in the formula (A), $R_a$ represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present]

[in the formula (B), $R_d$ represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom]

[in the formula (C), $R_h$ represents a hydrocarbon group of a carbon number of 2 to 20, and may contain a hetero atom, and $R_i$, $R_j$ and $R_k$ are the same or different, represent a hydrogen or a hydrocarbon group of a carbon number of 1 to 16, and may contain a hetero atom]

[in the formula (D), Z represents a nitrogen atom, a sulfur atom, or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present]

[Chemical formula 4]

In Formula (E), $R_p$ represents a hydrocarbon group of a carbon number of 1 to 18, and may contain a hetero atom.

Examples of the cation represented by the formula (A) include a pyridinium cation, a piperidinium cation, a pyrrolidinium cation, a cation having a pyrroline skeleton, and a cation having a pyrrole skeleton. Specific examples thereof include a 1-methylpyridinium cation, a 1-ethylpyridinium cation, a 1-propylpyridinium cation, a 1-butylpyridinium cation, a 1-penthylpyridinium cation, a 1-hexylpyridinium cation, a 1-hepthylpyridinium cation, a 1-oethylpyridinium cation, a 1-nonylpyridinium cation, a 1-decylpyridinium cation, a 1-arylpyridinium cation, a 1-propyl-2-methylpyrrolidinium cation, a 1-butyl-2-methylpyridinium cation, a 1-pentyl-2-methylpyridinium cation, a 1-hexyl-2-methylpyridinium cation, a 1-heptyl-2-methylpyridinium cation, a 1-octyl-2-methylpyridinium cation, a 1-nonyl-2-methylpyridinium cation, a 1-decyl-2-methylpyridinium cation, a 1-propyl-3-methylpyridinium cation, a 1-butyl-3-methylpyridinium cation, a 1-butyl-4-methylpyridinium cation, a 1-pentyl-3-methylpyridinium cation, a 1-hexyl-3-methylpyridinium cation, a 1-heptyl-3-methylpyridinium cation, a 1-octyl-3-methylpyridinium cation, a 1-octyl-4-methylpyridinium cation, a 1-nonyl-3-methylpyridinium cation, a 1-decyl-3-methylpyridinium cation, a 1-propyl-4-methylpyridinium cation, a 1-pentyl-4-methylpyridinium cation, a 1-hexyl-4-methylpyridinium cation, a 1-heptyl-4-methylpyridinium cation, a 1-nonyl-4-methylpyridinium cation, a 1-decyl-4-methylpyridinium cation, a 1-butyl-3,4-dimethylpyridinium cation, a 1,1-dimethylpyrolidium cation, a 1-ethyl-1-methylpyrrolidinium cation, a 1-methyl-1-propylpyrrolidinium cation, a 1-methyl-1-butylpyrrolidinium cation, a 1-methyl-1-pentylpyrrolidinium cation, a 1-methyl-1-hexylpyrrolidinium cation, a 1-methyl-1-heptylpyrrolidinium cation, a 1-methyl-1-octylpyrrolidinium cation, a 1-methyl-1-nonylpyrrolidinium cation, a 1-methyl-1-decylpyrrolidinium cation, a 1-methyl-1-methoxyethoxyethylpyrrolidinium cation, a 1-ethyl-1-propylpyrrolidinium cation, a 1-ethyl-1-butylpyrrolidinium cation, a 1-ethyl-1-pentylpyrrolidinium cation, a 1-ethyl-1-hexylpyrrolidinium cation, a 1-ethyl-1-heptylpyrrolidinium cation, a 1,1-dipropylpyrrolidinium cation, a 1-propyl-1-butylpyrrolidinium cation, a 1,1-dibutylpyrrolidinium cation, a 1-propylpiperidinium cation, a 1-pentylpiperidinium cation, a 1,1-dimethylpiperidinium cation, a 1-methyl-1-ethylpiperidinium cation, a 1-methyl-1-propylpiperidinium cation, a 1-methyl-1-butylpiperidinium cation, a 1-methyl-1-pentylpiperidinium cation, a 1-methyl-1-hexylpiperidinium cation, a 1-methyl-1-heptylpiperidinium cation, a 1-methyl-1-octylpiperidinium cation, a 1-methyl-1-decylpiperidinium cation, a 1-methyl-1-methoxyethoxypiperidinium cation, a 1-ethyl-1-propylpiperidinium cation, a 1-ethyl-1-butylpiperidinium cation, a 1-ethyl-1-pentylpiperidinium cation, a 1-ethyl-1-hexylpiperidinium cation, a 1-ethyl-1-heptylpyrrolidinium cation, a 1,1-dipropylpiperidinium cation, a 1-propyl-1-butylpiperidinium cation, a 1-propyl-1-pentylpiperidinium cation, a 1-propyl-1-hexylpiperidinium cation, a 1-propyl-1-heptylpiperidinium cation, a 1,1-dibutylpiperidinium cation, a 1-butyl-1-pentylpiperidinium cation, a 1-butyl-1-hexylpiperidinium cation, a 1-butyl-1-heptylpiperidinium cation, a 2-methyl-1-pyrroline cation, a 1-ethyl-2-phenylindole cation, a 1,2-dimethylindole cation and a 1-ethylcarbazole cation.

Examples of the cation represented by the formula (B) include an imidazolium cation, a tetrahydropyrimidinium cation, and a dihydropyrimidinium cation.

Specific examples include a 1,3-dimethylimidazolium cation, a 1,3-diethylimidazolium cation, a 1-methyl-3-ethylimidazolium cation, a 1-methyl-3-hexylimidazolium cation, a 1-ethyl-3-methylimidazolium cation, a 1-propyl-3-methylimidazolium cation, a 1-butyl-3-methylmidazolium cation, a 1-pentyl-3-methylmidazolium cation, a 1-hexyl-3-methylimidazolium cation, a 1-heptyl-3-methylimidazolium cation, a 1-ocytl-3-methylimidazolium cation, a 1-nonyl-3-methylimidazolium cation, a 1-decyl-3-methylimidazolium cation, a 1-dodecyl-3-methylimidazolium cation, a 1-tetradecyl-3-methylimidazolium cation, a 1-hexadecyl-3-methylimidazolium cation, a 1-octadecyl-3-methylimidazolium cation, a 1,2-dimethyl-3-propylimidazolium cation, a 1-ethyl-2,3-dimethylimidazolium cation, a 1-butyl-2,3-diethylimidazolium cation, a 1-hexyl-2,3-dimethylimidazolium cation, a 1,3-dimethyl-1,4,5,6-tetrahydropyrimidinium cation, a 1,2,3-trimethyl-1,4,5,6-tetrahydropyrimidinium cation, a 1,2,3,4-tetramethyl-1,4,5,6-tetrahydropyrimidinium cation, a 1,2,3,5-tetramethyl-1,4,5,6-tetrahydropyrimidinium cation, a 1,3-dimethyl-1,4-dihydropyrimidinium cation, a 1,3-dimethyl-1,6-dihydropyrimidinium cation, a 1,2,3-trimethyl-1,4-dihydropyrimidinium cation, a 1,2,3-trimethyl-1,6-dihydropyrimidinium cation, a 1,2,3,4-tetramethyl-1,4-dihydropyrimidinium cation, and a 1,2,3,4-tetramethyl-1,6-dihydropyrimidinium cation.

Examples of the cation represented by the formula (C) include a pyrazolium cation, and a pyrazolinium cation.

Specific examples thereof include a 1-methylpyrazolium cation, a 3-methylpyrazolium cation, a 1-ethyl-2,3,5-trimethylpyrazolium cation, a 1-propyl-2,3,5-trimethylpyrazolium cation, a 1-butyl-2,3,5-trimethylpyrazolium cation and a 1-ethyl-2-pyrazolinium cation.

Examples of the cation represented by the formula (D) include a tetraalkylammonium cation, a trialkylsulfonium cation, a tetraalkylphosphonium cation, and those cations in which a part of the alkyl group is substituted with an alkenyl group, an alkoxyl group, or an epoxy group. $R_l$, $R_m$, $R_n$, and $R_o$, may also be each an alkyl group having 1 to 20 carbon atoms. $R_l$, $R_m$, $R_n$, and $R_o$ may each contain an aromatic ring group or an aliphatic ring group.

Specific examples include a tetramethylammonium cation, a tetraethylammonium cation, a tetrapropylammonium cation, a tetrabutylammonium cation, a tetrapentylammonium cation, a tetrahexylammonium cation, a tetraheptylammonium cation, a tetraoctylammonium cation, a tetranonylammonium cation, a tetradecylammonium cation, a tetradodecylammonium cation, a tetrahexadecylammonium cation, a tetraoctadecylammonium cation, a trimethylbutylammonium cation, a trimethylpentylammonium cation, a trimethylhexylammonium cation, a trimethylheptylammonium cation, a trimethyloctylammonium cation, a trimethylnonylammonium cation, a trimethyldecylammonium cation, a trimethylcycrohexylammonium cation, a triethylmethylammonium cation, a triethylpropylammonium cation, a triethylbutylammonium cation, a triethylpenthylammonium cation, a triethylhexylammonium cation, a triethylheptylammonium cation, a triethyldecylammonium cation, a triethylmethoxyethoxyethylammonium cation, a tributylmethylammonium cation, a tributylethylammonium cation, a tributylpropylammonium cation, a tributylpentylammonium cation, a tributylhexylammonium cation, a tributylheptylammonium cation, a tripentylmethylammonium cation, a tripentylethylammonium cation, a tripentylpropylammonium cation, a tripentylbutylammonium cation, a tripentylhexylammonium cation, a tripentylheptylammonium cation, a trihexylmethylammonium cation, a trihexylethylammonium cation, a trihexylpropylammonium cation, a trihexylbutylammonium cation, a trihexylpentylammonium cation, a trihexylheptylammonium cation, a triheptylmethylammonium cation, a triheptylethylammonium cation, a triheptylpropylammonium cation, a triheptylbutylammonium cation, a triheptylpentylammonium cation, a triheptylhexylammonium cation, a trioctylmethylammonium cation, a trioctylethylammonium cation, a trioctylpropylammonium cation, a trioctylbutylammonium cation, a trioctylpentylammonium cation, a trioctylhexylammonium cation, a trioctylheptylammonium cation, a trioctyldodecylammonium cation, a trioctylhexyldecylammonium cation, a trioctyloctadecylammonium cation, a trinonylmethylammonium cation, a tridecylmethlammonium cation, a glycidiyltrimethylammonium cation, a N,N-diallyl-N,N-dimethylammonium cation, a N,N-dimethyl-N,N-diethylammonium cation, a N,N-dimethyl-N,N-dipropylammonium cation, a N,N-dimethyl-N,N-dibutylammonium cation, a N,N-dimethyl-N,N-dipentylammonium cation, a N,N-dimethyl-N,N-dihexylammonium cation, a N,N-dimethyl-N,N-diheptylammonium cation, a N,N-dimethyl-N,N-dioctylammonium cation, a N,N-dimethyl-N,N-dinonylammonium cation, a N,N-dimethyl-N,N-didecylammonium cation, a N,N-diallyl-N,N-dipropylammonium cation, a N,N-dipropyl-N,N-diethylammonium cation, a N,N-dipropyl-N,N-dibutylammonium cation, a N,N-dipropyl-N,N-dipentylammonium cation, a N,N-dipropyl-N,N-dihexylammonium cation, a N,N-dimethyl-N-ethyl-N-propylammonium cation, a N,N-dimethyl-N-ethyl-N-butylammonium cation, a N,N-dimethyl-N-ethyl-N-pentylam monium cation, a N,N-dimethyl-N-ethyl-N-hexylammonium cation, a N,N-dimethyl-N-ethyl-N-heptylammonium cation, a N,N-dimethyl-N-ethyl-N-nonylammonium cation, a N,N-dimethyl-N-ethyl-N-methoxyethoxyethylammonium cation, a N,N-dimethyl-N-ethyl-N-ethoxyethoxyethylammonium cation, a N,N-dimethyl-N-propyl-N-butylammonium cation, a N,N-dimethyl-N-propyl-N-pentylammonium cation, a N,N-dimethyl-N-propyl-N-hexylammonium cation, a N,N-dimethyl-N-propyl-N-heptylammonium cation, a N,N-dimethyl-N-butyl-N-hexylammonium cation, a N,N-dimethyl-N-butyl-N-heptylammonium cation, a N,N-dimethyl-N-pentyl-N-hexylammonium cation, a N,N-dimethyl-N-hexyl-N-heptylammonium cation, a N,N-diethyl-N-methyl-N-propylammonium cation, a N,N-diethyl-N-methyl-N-pentylammonium cation, a N,N-diethyl-N-methyl-N-heptylammonium cation, a N,N-diethyl-N-methyl-N-(2-methoxyethyl)ammonium cation, a N,N-diethyl-N-methyl-N-methoxyethoxyethylammonium cation, a N,N-diethyl-N-propyl-N-pentylammonium cation, a N,N-dipropyl-N-methyl-N-ethylammonium cation, a N,N-dipropyl-N-methyl-N-pentylammonium cation, a N,N-dipropyl-N-butyl-N-hexylammonium cation, a N,N-dibutyl-N-methyl-N-pentylammonium cation, a N,N-dibutyl-N-methyl-N-hexylammonium cation, a N,N-diallyl-N-methyl-hexylammonium cation, a N,N-diallyl-N-methyl-octylammonium cation, a N-methyl-N-ethyl-N-propyl-N-butylammonium cation, a N-methyl-N-ethyl-N-propyl-N-pentylammonium cation, a N-methyl-N-ethyl-N-propyl-N- hexylammonium cation, a trimethylsulfonium cation, a triethylsulfonium cation, a tributylsulfonium cation, a trihexylsulfonium cation, a dimethyldecylsulfonium cation, a diethylmethylsulfonium cation, a dibutylethylsulfonium cation, a tetramethylsulfonium cation, a tetraethylphosphonium cation, a tetrabutylphosphonium cation, a tetrapentylphosphonium cation, a tetrahexylphosphonium cation, a tetraheptylphosphonium cation, a traoctylphosphonium cation, a tranonylphosphonium cation, a tetradecylsulfonium cation, a trimethylpentylphosphonium cation, a trimethylhexylphosphonium cation, a trimethylheptylphosphonium cation, a trimethyloctylphosphonium cation, a trimethylnonylphosphonium cation, a trimethyldecylphosphonium cation, a trimethylmethoxylethoxyethylphosphonium cation, a triethylmethylphosphonium cation, a tributylethylphosphonium cation, a tripentylmethylphosphonium cation, a trihexylmethylphosphonium cation, a triheptylmethylphosphonium cation, a triocylmethylphosphonium cation, a trinonylmethylphosphonium cation, a tridecylmethylphosphonium cation, a N,N,N-trihexyl-N-tetradecylphosphonium cation, a N,N-dimethyl-N,N-dipentylphosphonium cation, a N,N-dimethyl-N,N-dihexylphosphonium cation, a N,N-dimethyl-N,N-diheptylphosphonium cation, a N,N-dimethyl-N,N-dioctylphosphonium cation, a N,N-dimethyl-N,N-dinonylphosphonium cation, a N,N-dimethyl-N,N-didecylphosphonium cation, a N,N-dimethyl-N-ethyl-N-methoxyethoxyethylphosphonium cation.

Inter alia, tetraalkylammonium cation such as a trimethylbutylammonium cation, a trimethylpenthylammonium cation, a trimethylhexylammonium cation, a trimethylheptylammonium cation, a trimethyloctylammonium cation, a trimethylnonylammonium cation, a trimethyldecylammonium cation, a trimethylcycrohexylammonium cation, a triethylmethylammonium cation, a triethylpropylammonium cation, a triethylbutylammonium cation, a triethylpenthylammonium cation, a triethylhexylammonium cation, a triethylheptylammonium cation, a triethyldecylammonium cation, a triethylmethoxyethoxyethylammonium cation, a tributylmethylammonium cation, a tributylethylammonium cation, a triethylpropylammonium cation, a triethylpentylammonium cation, a triethylhexylammonium cation, a triethylheptylammonium cation, a tripentylmethylammonium cation, a tripentylethylammonium cation, a tripentylpropylammonium cation, a tripentylbutylammonium cation, a tripentylhexylammonium cation, a tripentylheptylammonium cation, a trihexylmethylammonium cation, a trihexylethylammonium cation, a trihexylpropylammonium cation, a trihexylbutylammonium cation, a trihexylpentylammonium cation, a trihexylheptylammonium cation, a triheptylmethylammonium cation, a triheptylethylammonium cation, a triheptylpropylammonium cation, a triheptylbutylammonium cation, a triheptylpentylammonium cation, a triheptylhexylammonium cation, a trioctylmethylammonium cation, a trioctylethylammonium cation, a trioctylpropylammonium cation, a trioctylbutylammonium cation, a trioctylpentylammonium cation, a trioctylhexylammonium cation, a trioctylheptylammonium cation, a trioctyldodecylammonium cation, a trioctylhexyldecylammonium cation, a trioctyloctadecylammonium cation, a trinonylmethylammonium cation, a tridecylmethlammonium cation, a glycidiyltrimethylammonium cation, a N,N-dimethyl-N-ethyl-N-propylammonium cation, a N,N-dimethyl-N-ethyl-N-butylammonium cation, a N,N-dimethyl-N-ethyl-N-pentylammonium cation, a N,N-dimethyl-N-ethyl-N-hexylammonium cation, a N,N-dimethyl-N-ethyl-N-heptylammonium cation, a N,N-dimethyl-N-ethyl-N-nonylammonium cation, a N,N-dimethyl-N-ethyl-N-methoxyethoxyethylammonium cation, a N,N-dimethyl-N-ethyl-N-ethoxyethoxyethylammonium cation, a N,N-dimethyl-N-propyl-N-butylammonium cation, a N,N-dimethyl-N-propyl-N-pentylammonium cation, a N,N-dimethyl-N-propyl-N-hexylammonium cation, a N,N-dimethyl-N-propyl-N-heptylammonium cation, a N,N-dimethyl-N-butyl-N-hexylammonium cation, a N,N-dimethyl-N-butyl-N-heptylammonium cation, a N,N-dimethyl-N-pentyl-N-hexylammonium cation, a N,N-dimethyl-N-hexyl-N-heptylammonium cation, a N,N-diethyl-N-methyl-N-propylammonium cation, a N,N-diethyl-N-methyl-N-pentylammonium cation, a N,N-diethyl-N-methyl-N-heptylammonium cation, a N,N-diethyl-N-methyl-N-(2-methoxyethyl)ammonium cation, a N,N-diethyl-N-methyl-N-methoxyethoxyethylammonium cation, a N,N-diethyl-N-propyl-N-pentylammonium cation, a N,N-dipropyl-N-methyl-N-ethylammonium cation, a N,N-dipropyl-N-methyl-N-pentylammonium cation, a N,N-dipropyl-N-butyl-N-hexylammonium cation, a N,N-dibutyl-N-methyl-N-pentylammonium cation, a N,N-dibutyl-N-methyl-N-hexylammonium cation, a N,N-dially-N-methyl-hexylammonium cation, a N,N-dially-N-methyl-N-octylammonium cation, a N-methyl-N-ethyl-N-propyl-N-butylammonium cation, a N-methyl-N-ethyl-N-propyl-N-pentylammonium cation, a N-methyl-N-ethyl-N-propyl-N-hexylammonium cation, trialkylsulfonium cation such as a dimethyldecylsulfonium cation, a dimethyldodecylsulfonium cation, a diethylmethylsulfonium cation, a dibutylethylsulfonium cation, tetraalkylsulfonium cation such as a trimethylpentylphosphonium cation, a trimethylhexylphosphonium cation, a trimethylheptylphosphonium cation, a trimethyloctylphosphonium cation, a trimethylnonylphosphonium cation, a trimethyldecylphosphonium cation, a trimethoxylethoxyethylphosphonium cation, a triethylmethylphosphonium cation, a tributylethylphosphonium cation, a tripentylmethylphosphonium cation, a trihexylmethylphosphonium cation, a triheptylmethylphosphonium cation, a triocylmethylphosphonium cation, a trinonylmethylphosphonium cation, a tridecylmethylphosphonium cation, a N,N,N-trihexyl-N-tetradecylphosphonium cation, a N,N-dimethyl-N-ethyl-N-methoxyethoxyethylphosphonium cation.

Specific examples of the cation represented by Formula (E) include sulfonium salts each having, as $R_p$, an alkyl group having 1 to 18 carbon atoms, such as methyl, ethyl, propyl, butyl, hexyl, octyl, nonyl, decyl, dodecyl, tridecyl, tetradecyl, or octadecyl.

On the other hand, the anionic component is not particularly limited as far as it satisfies that it becomes an ionic liquid. Specifically, for example, $Cl^-$, $Br^-$, $I^-$, $AlCl_4^-$, $Al_2Cl_7^-$, $BF_4^-$, $PF_6^-$, $ClO_4^-$, $NO_3^-$, $CH_3COO^-$, $CF_3COO^-$, $CH_3SO_3^-$, $CF_3SO_3^-$, $(CF_3SO_2)_2N^-$, $(CF_3SO_2)_3C^-$, $AsF_6^-$, $SbF_6^-$, $NbF_6^-$, $TaF_6^-$, $F(HF)_n^-$, $(CN)_2N^-$, $C_4F_9SO_3^-$, $(C_2F_5SO_2)_2N^-$, $C_3F_7COO^-$, and $(CF_3SO_2)(CF_3CO)N^-$, $C_9H_{19}COO^-$, $(CH_3)_2PO_4^-$, $(C_2H_5)_2PO_4^-$, $C_2H_5OSO_3^-$, $C_6H_{13}OSO_3^-$, $C_8H_{17}OSO_3^-$, $CH_3(OC_2H_4)_2OSO_3^-$, $C_6H_4(CH_3)SO_3^-$, $(C_2F_5)_3PF_3^-$, $CH_3CH(OH)COO^-$, and anions represented by Formula (F). In particular, hydrophobic anions tend to less bleed to the surface of the adhesive agent and thus are preferably used in view of low staining. In addition, among them, in particular, an anionic component containing a fluorine atom is preferably used because a low melting point ionic compound is obtained.

[Chemical formula 5]

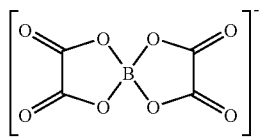

(F)

An embodiment of an ionic liquid used in the present invention is used by appropriately selecting from a combination of the aforementioned cation component and anion component.

Examples include 1-butylpyridinium tetrafluoroborate, 1-butylpyridinium hexafluorophosphate, 1-butyl-3-methylpyridinium tetrafluoroborate, 1-butyl-3-methylpyridinium trifluoromethanesulfonate, 1-butyl-3-methylpyridinium bis(trifluoromethaneslufonyl)imide, 1-butyl-3-methylpyridinium bis(pentafluoroethanesulfonyl)imide, 1-hexylpyridinium tetrafluoroborate, 1-allypyridinium bis(trifluoromethaneslufonyl)imide, 1,1-dimethylpyroridinium bis(trifluoromethaneslufonyl)imide, 1-methyl-1-ethyl pyroridinium bis(trifluoromethanesulfonyl)imide, 1-methyl-1-propyl pyroridinium bis(trifluoromethanesulfonyl)imide, 1-methyl-1-butyl pyroridinium bis(trifluoromethanesulfonyl)imide, 1-methyl-1-pentyl pyroridinium bis(trifluoromethanesulfonyl)imide, 1-methyl-1-hexyl pyroridinium bis(trifluoromethanesulfonyl)imide, 1-methyl-1-heptyl pyroridinium bis(trifluoromethanesulfonyl)imide, 1,1-diethyl pyroridinium bis(trifluoromethanesulfonyl)imide, 1-ethyl-1-propyl pyroridinium bis(trifluoromethanesulfonyl)imide, 1-ethyl-1-butyl pyroridinium bis(trifluoromethanesulfonyl)imide, 1-ethyl-1-pentyl pyroridinium bis(trifluoromethanesulfonyl)imide, 1-ethyl-1-hexyl pyroridinium bis(trifluoromethanesulfonyl)imide, 1-ethyl-1-heptyl pyroridinium bis(trifluoromethanesulfonyl)imide, 1,1-dipropyl pyroridinium bis(trifluoromethaneslufonyl)imide, 1-propyl-1-butyl pyroridinium bis(trifluoromethanesulfonyl)imide, 1-propyl-1-pentyl pyperidinium bis(trifluoromethanesulfonyl)imide, 1-propyl-1-hexyl pyroridinium bis(trifluoromethanesulfonyl)imide, 1-propyl-1-heptyl pyroridinium bis(trifluoromethanesulfonyl)imide, 1,1-dibutyl pyroridinium bis(trifluoromethaneslufonyl)imide, 1-propyl pyperidinium bis(trifluoromethanesulfonyl)imide, 1-pentyl pyperidinium bis(trifluoromethanesulfonyl)imide, 1,1-dimethyl pyperidinium bis(trifluoromethanesulfonyl)imide, 1-methyl-1-ethyl pyperidinium bis(trifluoromethanesulfonyl)imide, 1-methyl-1-propyl pyperidinium bis(trifluoromethanesulfonyl)imide, 1-methyl-1-butyl pyperidinium bis(trifluoromethanesulfonyl)imide, 1-methyl-1-pentyl pyperidinium bis(trifluoromethanesulfonyl)imide, 1-methyl-1-hexyl pyperidinium bis(trifluoromethanesulfonyl)imide, 1-methyl-1-heptyl pyperidinium bis(trifluoromethanesulfonyl)imide, 1,1-diethyl pyperidinium bis(trifluoromethanesulfonyl)imide, 1-ethyl-1-propyl pyperidinium bis(trifluoromethanesulfonyl)imide, 1-ethyl-1-butyl pyperidinium bis(trifluoromethanesulfonyl)imide, 1-ethyl-1-pentyl pyperidinium bis(trifluoromethanesulfonyl)imide, 1-ethyl-1-hexyl pyperidinium bis(trifluoromethanesulfonyl)imide, 1-ethyl-1-heptyl pyperidinium bis(trifluoromethanesulfonyl)imide, 1,1-dipropyl pyperidinium bis(trifluoromethaneslufonyl)imide, 1-propyl-1-butyl pyperidinium bis(trifluoromethanesulfonyl)imide, 1-propyl-1-pentyl pyperidinium bis(trifluoromethanesulfonyl)imide, 1-propyl-1-hexyl pyperidinium bis(trifluoromethanesulfonyl)imide, 1-propyl-1-heptyl pyperidinium bis(trifluoromethanesulfonyl)imide, 1,1-dibutyl pyperidinium bis(trifluoromethaneslufonyl)imide, 1-propyl pyroridinium bis(pentafluoroethanesulfonyl)imide, 1-pentyl pyroridinium bis(pentafluoroethanesulfonyl)imide, 1,1-dimethylpyroridinium bis(pentafluoroethanesulfonyl)imide, 1-methyl-1-ethyl pyroridinium bis(pentafluoroethanesulfonyl)imide, 1-methyl-1-propyl pyroridinium bis(pentafluoroethanesulfonyl)imide, 1-methyl-1-butyl pyroridinium bis(pentafluoroethanesulfonyl)imide, 1-methyl-1-pentyl pyroridinium bis(pentafluoroethanesulfonyl)imide, 1-methyl-1-hexyl pyroridinium bis(pentafluoroethanesulfonyl)imide, 1-methyl-1-heptyl pyroridinium bis(pentafluoroethanesulfonyl)imide, 1,1-diethyl pyroridinium bis(pentafluoroethanesulfonyl)imide, 1-ethyl-1-propyl pyroridinium bis(pentafluoroethanesulfonyl)imide, 1-ethyl-1-butyl pyroridinium bis(pentafluoroethanesulfonyl)imide, 1-ethyl-1-pentyl pyroridinium bis(pentafluoroethanesulfonyl)imide, 1-ethyl-1-hexyl pyroridinium bis(pentafluoroethanesulfonyl)imide, 1-ethyl-1-heptyl pyroridinium bis(pentafluoroethanesulfonyl)imide, 1,1-dipropyl pyroridinium bis(pentafluoroethaneslufonyl)imide, 1-propyl-1-butyl pyroridinium bis(pentafluoroethanesulfonyl)imide, 1-propyl-1-pentyl pyroridinium bis(pentafluoroethanesulfonyl)imide, 1-propyl-1-hexyl pyroridinium bis(pentafluoroethanesulfonyl)imide, 1-propyl-1-heptyl pyroridinium bis(pentafluoroethanesulfonyl)imide, 1,1-dibutyl pyroridinium bis(pentafluoroethaneslufonyl)imide, 1-propyl pyperidinium bis(pentafluoroethanesulfonyl)imide, 1-pentyl pyperidinium bis(pentafluoroethanesulfonyl)imide, 1,1-dimethyl pyperidinium bis(pentafluoroethanesulfonyl)imide, 1-methyl-1-ethyl pyperidinium bis(pentafluoroethanesulfonyl)imide, 1-methyl-1-propyl pyperidinium bis(pentafluoroethanesulfonyl)imide, 1-methyl-1-butyl pyperidinium bis(pentafluoroethanesulfonyl)imide, 1-methyl-1-pentyl pyperidinium bis(pentafluoroethanesulfonyl)imide, 1-methyl-1-hexyl pyperidinium bis(pentafluoroethanesulfonyl)imide, 1-methyl-1-heptyl pyperidinium bis(pentafluoroethanesulfonyl)imide, 1,1-diethyl pyperidinium bis(pentafluoroethanesulfonyl)imide, 1-ethyl-1-propyl pyperidinium bis(pentafluoroethanesulfonyl)imide, 1-ethyl-1-butyl pyperidinium bis(pentafluoroethanesulfonyl)imide, 1-ethyl-1-pentyl pyperidinium bis(pentafluoroethanesulfonyl)imide, 1-ethyl-1-hexyl pyperidinium bis(pentafluoroethanesulfonyl)imide, 1-ethyl-1-heptyl pyperidinium bis(pentafluoroethanesulfonyl)imide, 1,1-dipropyl pyperidinium bis(pentafluoroethaneslufonyl)imide, 1-propyl-1-butyl pyperidinium bis(pentafluoroethanesulfonyl)imide, 1-propyl-1-pentyl pyperidinium bis(pentafluoroethanesulfonyl)imide, 1-propyl-1-hexyl pyperidinium bis(pentafluoroethanesulfonyl)imide, 1-propyl-1-heptyl pyperidinium bis(pentafluoroethanesulfonyl)imide, 1,1-dibutyl pyperidinium bis(pentafluoroethaneslufonyl)imide, 2-methyl-1-pyrroline tetrafluoroborate, 1-ethyl-2-phenylindole tetrafluoroborate, 1,2-dimethylindole tetrafluoroborate, 1-ethylcarbazole tetrafluoroborate, 1,3-dimethylimidazolium dimethylphosphate, 1-methyl-3-ethylimidazolium diethylphosphate, 1-methyl-3-ethylimidazolium ethylsulfate, 1-methyl-3-ethylimidazolium ethoxyethoxymethylsulfate, 1-methyl-3-ethylimidazolium octylsulfate, 1-methyl-3-hexylimidazolium tripentafluoroethanetrifluorophosphate, 1-ethyl-3-methylimidazolium hexafluorophosphate, 1-ethyl-3-methylimidazolium tetrafluoroborate, 1-ethyl-3-methylimidazolium acetate, 1-ethyl-3-methylimidazolium trifluoroacetate, 1-ethyl-3-methylimidazolium heptafluorobutyrate, 1-ethyl-3-methylimidazolium trifluoromethanesulfonate, 1-ethyl-3-methylimidazolium perfluorobutanesulfonate, 1-ethyl-3-methylimidazolium dicyanamide, 1-ethyl-3-methylimidazolium bis(trifluoromethanesulfonyl)imide, 1-ethyl-3-methylimidazolium bis(pentafluoroethanesulfonyl)imide, 1-ethyl-3-methylimidazolium tris(trifluoromethanesulfonyl)methide, 1-butyl-3-methylimidazolium tetrafluoroborate, 1-butyl-3-methylimidazolium hexafluorophosphate, 1-butyl-3-methylimidazolium trifluoroacetate, 1-butyl-3-methylimidazolium heptafluorobutyrate, 1-butyl-3-methylimidazolium trifluoromethanesulfonate, 1-butyl-3-methylimidazolium perfluorobutanesulfonate, 1-butyl-3-methylimidazolium bis(trifluoromethanesulfonyl)imide, 1-hexyl-3-methylimidazolium bromide, 1-hexyl-3-methylimidazolium chloride, 1-hexyl-3-methylimidazolium tetrafluoroborate, 1-hexyl-3-methylimidazolium hexafluorophosphate, 1-hexyl-3-methylimidazolium trifluoromethanesulfonate, 1-octyl-3-methylimidazolium tetrafluoroborate, 1-octyl-3-methylimidazolium hexafluorophosphate, 1-hexyl-2,3-dimethylimidazolium tetrafluoroborate, 1,2-dimethyl-3-propylimidazolium bis(trifluoromethanesulfonyl)imide, 1-methylpyrazolium tetrafluoroborate, 3-methylpyrazolium tetrafluoroborate, 1-ethyl-2,3,5-trimethylpyrazorium bis(trifluoromethanesulfonyl)imide, 1-propyl-2,3,5-trimethylpyrazorium bis(trifluoromethanesulfonyl)imide, 1-butyl-2,3,5-trimethylpyrazorium bis(trifluoromethanesulfonyl)imide, tetrapentylammonium trifluoromethanesulfornate, tetrapentylammonium bis(trifluoromethanesulfonyl)imide, tetrahexylammonium bis(trifluoromethanesulfonyl)imide, diallyldimethylammonium tetrafluoroborate, diallyldimethylammonium trifluoromethanesulfonate, diallyldimethylammonium bis(trifluoromethanesulfonyl)imide, diallyldimethylammonium bis(pentafluoromethanesulfonyl)imide, N,N-dimethyl-N-ethyl-N-methoxyethoxyethylammonium bis(trifluoromethanesulfonyl)imide, N,N-diethyl-N-methyl-N-(2-methoxyethyl)ammonium tetrafluoroborate, N,N-diethyl-N-methyl-N-(2-methoxyethyl)ammonium trifluoromethanesulfonate, N,N-diethyl-N-methyl-N-(2-methoxyethyl)ammonium bis(nyl)imide, N,N-diethyl-N-methyl-N-(2-methoxyethyl)ammonium bis(pentafluoroethanesulfonyl)imide, glycidyltrimethylammonium trifluoromethanesulfonate, glycidyltrimethylammonium bis(trifluoromethanesulfonyl)imide, glycidyltrimethylammonium bis(pentafluoroethanesulfonyl)imide, 1-butylpyridinium (trifluoromethanesulfonyl)trifluoroacetamide, 1-butyl-3-methylpyridinium (trifluoromethanesulfonyl)trifluoroacetamide, 1-ethyl-3-methylimidazolium (trifluoromethanesulfonyl)trifluoroacetamide, N,N-diethyl-N-methyl-N-(2-methoxyethyl)ammonium (trifluoromethanesulfonyl)trifluoroacetamide, diallyldimethylammonium (trifluoromethanesulfonyl)trifluoroacetamide, glycidyltrimethylammonium (trifluoromethanesulfonyl)trifluoroacetamide, N,N-dimethyl-N-ethyl-N-propylammonium bis(trifluoromethanesulfonyl)imide, N,N-dimethyl-N-ethyl-N-butylammonium bis(trifluoromethanesulfonyl)imide, N,N-dimethyl-N-ethyl-N-pentylammonium bis(trifluoromethanesulfonyl)imide, N,N-dimethyl-N-ethyl-N-hexylammonium bis(trifluoromethanesulfonyl)imide, N,N-dimethyl-N-ethyl-N-heptylammonium bis(trifluoromethanesulfonyl)imide, N,N-dimethyl-N-ethyl-N-nonylammonium bis(trifluoromethanesulfonyl)imide, N,N-dimethyl-N,N-dipropylammonium bis(trifluoromethanesulfonyl)imide, N,N-dimethyl-N-propyl-N-butylammonium bis(trifluoromethanesulfonyl)imide, N,N-dimethyl-N-propyl-N-pentylammonium bis(trifluoromethanesulfonyl)imide, N,N-dimethyl-N-propyl-N-hexylammonium bis(trifluoromethanesulfonyl)imide, N,N-dimethyl-N-propyl-N-heptylammonium bis(trifluoromethanesulfonyl)imide, N,N-dimethyl-N-butyl-N-hexylammonium bis(trifluoromethanesulfonyl)imide, N,N-dimethyl-N-butyl-N-heptylammonium bis(trifluoromethanesulfonyl)imide, N,N-dimethyl-N-butyl-N-hexylammonium bis(trifluoromethanesulfonyl)imide, N,N-dimethyl-N-butyl-N-heptylammonium bis(trifluoromethanesulfonyl)imide, N,N-dimethyl-N-pentyl-N-hexylammonium bis(trifluoromethanesulfonyl)imide, N,N-dimethyl-N,N-dihexylammonium bis(trifluoromethanesulfonyl)imide, trimethylheptylammonium bis(trifluoromethanesulfonyl)imide, N,N-diethyl-N-methyl-N-propylammonium bis(trifluoromethanesulfonyl)imide, N,N-diethyl-N-methyl-N-pentylammonium bis(trifluoromethanesulfonyl)imide, N,N-diethyl-N-methyl-N-heptylammonium bis(trifluoromethanesulfonyl)imide, N,N-diethyl-N-propyl-N-pentylammonium bis(trifluoromethanesulfonyl)imide, triethylpropylammonium bis(trifluoromethanesulfonyl)imide, triethylpentylammonium bis(trifluoromethanesulfonyl)imide, triethylheptylammonium bis(trifluoromethanesulfonyl)imide, N,N-dipropyl-N-methyl-N-ethylammonium bis(trifluoromethanesulfonyl)imide, N,N-dipropyl-N-methyl-N-pentylammonium bis(trifluoromethanesulfonyl)imide, N,N-dipropyl-N-butyl-N-hexylammonium bis(trifluoromethanesulfonyl)imide, N,N-dipropyl-N,N-dihexylammonium bis(trifluoromethanesulfonyl)imide, N,N-dibutyl-N-methyl-N-pentylammonium bis(trifluoromethanesulfonyl)imide, N,N-dibutyl-N-methyl-N-hexylammonium bis(trifluoromethanesulfonyl)imide, trioctylmethylammonium bis(trifluoromethanesulfonyl)imide, N-methyl-N-ethyl-N-propyl-N-pentylammonium bis(trifluoromethanesulfonyl)imide, N,N,N-trihexyl-N-tetradecylphosphonium bis(trifluoromethanesulfonyl)imide, N,N,N-trihexyl-N-tetradecylphosphonium caprate, N,N,N-trihexyl-N-tetradecylphosphonium tripentafluoroethanetrifluorophosphate, and ionic liquids represented by Formula (G) below.

[Chemical formula 6]

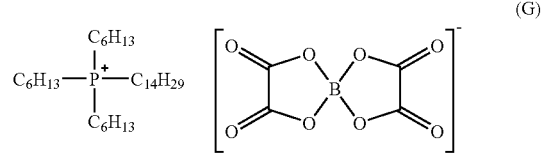

(G)

As the aforementioned ionic liquid, a commercially available ionic liquid may be used, or the liquid may be synthesized as described below.

A method of synthesizing an ionic liquid is not particularly limited as far as an objective ionic liquid is obtained. Generally, a halide method, a hydroxide method, an acid ester method, a chelate forming method, and a neutralization method described in the publication "Ionic liquid—The Front and Future of Development—" (published by CMC Publishing Co., LTD.) are used.

Regarding a halide method, a hydroxide method, an acid ester method, a chelate forming method, and a neutralization method, a synthesis method using an example of a nitrogen-containing onium salt will be shown below, but other ionic liquid such as a sulfur-containing onium salt, and a phosphorus-containing onium salt can be obtained by the similar procedure.

The halide method is a method which is performed by a reaction shown in the following formulas (1) to (3). First, a tertiary amine and alkyl halide are reacted to obtain halide (Reaction Equation (1), as a halogen, chlorine, bromine or iodine is used).

The resulting halide is reacted with an acid (HA) having an anion structure ($A^-$) of an objective ionic liquid or a salt (MA, M is a cation forming a salt with an objective anion such as ammonium, lithium, sodium and potassium) of an objective ionic liquid to obtain an objective ionic liquid ($R_4NA$).

[Chemical formula 7]

$$R_3N + RX \rightarrow R_4NX \quad (X: Cl, Br, I) \tag{1}$$

$$R_4NX + HA \rightarrow R_4NA + HX \tag{2}$$

$$R_4NX + MA \rightarrow R_4NA + MX \quad (M: NH_4, Li, Na, K, Ag \text{ etc.}) \tag{3}$$

The hydroxide method is a method performed by a reaction shown in (4) to (8). First, a halide ($R_4NX$) is subjected to ion exchange membrane method electrolysis (reaction equation (4)), an OH-type ion exchange resin method (reaction equation (5)) or a reaction with silver oxide ($Ag_2O$) (reaction equation (6)) to obtain a hydroxide ($R_4NOH$) (as a halogen, chlorine, bromine or iodine is used).

The resulting hydroxide is subjected to a reaction of reaction equations (7) to (8) as in the aforementioned halide method to obtain an objective ionic liquid ($R_4NA$).

[Chemical formula 8]

$$R_4NX + H_2O \rightarrow R_4NOH + \tfrac{1}{2}H_2 + \tfrac{1}{2}X_2 \quad (X: Cl, Br, I) \tag{4}$$

$$R_4NX + P\text{—}OH \rightarrow R_4NOH + P\text{—}X \quad (P\text{—}OH: OH\text{-type ion exchange resin}) \tag{5}$$

$$R_4NX + \tfrac{1}{2}Ag_2O + \tfrac{1}{2}H_2O \rightarrow R_4NOH + AgX \tag{6}$$

$$R_4NOH + HA \rightarrow R_4NA + H_2O \tag{7}$$

$$R_4NOH + MA \rightarrow R_4NA + MOH \quad (M: NH_4, Li, Na, K, Ag \text{ etc.}) \tag{8}$$

The acid ester method is a method performed by a reaction shown in (9) to (11). First, tertiary amine ($R_3N$) is reacted with acid ester to obtain an acid esterified substance (reaction equation (9), as acid ester, ester of an inorganic acid such as sulfuric acid, sulfurous acid, phosphoric acid, phosphorous acid, and carbonic acid, or ester of organic acid such as methanesulfonic acid, methylphosphonic acid and formic acid is used).

The resulting acid esterified substance is subjected to a reaction of reaction equations (10) to (11) as in the aforementioned halide method, to obtain an objective ionic liquid ($R_4NA$). Alternatively, as acid ester, methyl trifluoromethane sulfonate, or methyl trifluoroacetate may be used to directly obtain an ionic liquid.

[Chemical formula 9]

$$R_3N + ROY \rightarrow R_4NOY \tag{9}$$

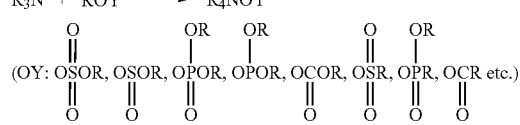

$$R_4NOY + HA \rightarrow R_4NA + HOY \tag{10}$$

-continued

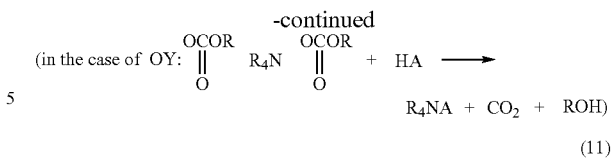

$$R_4NOY + MA \rightarrow R_4NA + MOY \quad (M: NH_4, Li, Na, K, Ag, \text{etc.})$$

The chelate forming method is a method performed by a reaction as shown in (12) to (15). First, halide of quaternary ammonium ($R_4NX$), hydroxide of quaternary ammonium ($R_4NOH$), or carbonic acid esterified substance of quaternary ammonium ($R_4NOCO_2CH_3$) is reacted with hydrogen fluoride (HF) or ammonium fluoride ($NH_4F$) to obtain a quaternary ammonium fluoride salt (reaction equation (12) to (14)).

The resulting quaternary ammonium fluoride salt can be subjected to a chelate forming reaction with fluoride such as $BF_3$, $AlF_3$, $PF_5$, $ASF_5$, $SbF_5$, $NbF_5$ and $TaF_6$, to obtain an ionic liquid (reaction equation (15)).

[Chemical formula 10]

$$R_4NX + HF \rightarrow R_4NF + HX \quad (X: Cl, Br, I) \tag{12}$$

$$R_4NY + HF \rightarrow R_4NF + HY \quad (Y: OH, OCO_2CH_3) \tag{13}$$

$$R_4NY + NH_4F \rightarrow R_4NF + NH_3 + HY \quad (Y: OH, OCO_2CH_3) \tag{14}$$

$$R_4NF + MF_{n-1} \rightarrow R_4NMF_n \tag{15}$$

($MF_{n-1}$: $BF_3$, $AlF_3$, $PF_5$, $ASF_5$, $SbF_5$, $NbF_5$, $TaF_5$ etc.)

The neutralization method is a method performed by a reaction shown in (16). An ionic liquid can be obtained by reacting tertiary amine and an organic acid such as $HBF_4$, $HPF_6$, $CH_3COOH$, $CF_3COOH$, $CF_3SO_3H$, $(CF_3SO_2)_2NH$, $(CF_3SO_2)_3CH$, and $(C_2F_5SO_2)_2NH$.

[Chemical formula 11]

$$R_3N + HZ \rightarrow R_3HN^+Z^- \tag{16}$$

[HZ: $HBF_4$, $HPF_6$, $CH_3COOH$, $CF_3COOH$, $CF_3SO_3H$, $(CF_3SO_2)_2NH$, $(CF_3SO_2)_3CH$, $(C_2F_5SO_2)_2NH$ organic acid such as]

The R of aforementioned (1)~(16) represents hydrogen or a hydrocarbon group of a carbon number of 1 to 20, and may contain a hetero atom.

The blending amount of the ionic liquid can not unconditionally be defined by reason of changing by compatibility between the polymer and the ionic liquid to be used, but yet is generally preferably 0.01 to 10 parts by weight, more preferably 0.03 to 7 parts by weight and further more preferably 0.05 to 5 parts by weight and still further more preferably 0.07 to 3 parts by weight and most preferably 0.1 to 1 parts by weight with respect to 100 parts by weight of the base polymer. The blending amount of less than 0.01 parts by weight does not allow sufficient antistatic property, while the blending amount of more than 10 parts by weight brings a tendency to increase staining on the adherend.

In the pressure sensitive adhesive composition of the present invention, pressure sensitive adhesive sheets further excellent in heat resistance and weather resistance are obtained by appropriately crosslinking a base polymer, in particular, a (meth)acryl-based polymer. Examples of a specific means for a crosslinking method include a so-called method of using a crosslinking agent, in which a compound having a group reactive with a carboxyl group, a hydroxyl group, an amino group or an amido group which is appropriately contained as a crosslinking basal point in a (meth)acryl-based polymer such as an isocyanate compound, an epoxy compound, a melanine-based resin and an aziridine compound, carbodiimide compound, and a metallic chelate compound is added to react them. Principally in order to obtain moderate cohesive strength, the isocyanate compound or the epoxy compound is particularly preferably used. These compounds may be used alone, or may be used by mixing two or more kinds of them.

Examples of the isocyanate compound include aromatic isocyanates such as tolylenediisocyanate and xylenediisocyanate, alicyclic isocyanates such as isophoronediisocyanate, aliphatic isocyanates such as hexamethylenediisocyanate.

More specifically, examples of the isocyanate compound include lower aliphatic polyisocyanates such as butylene diisocyanate and hexamethylene diisocyanate; alicyclic isocyanates such as cyclopentylene diisocyanate, cyclohexylene diisocyanate and isophorone diisocyanate; aromatic diisocyanates such as 2,4-tolylene diisocyanate, 4,4'-diphenylmethane diisocyanate and xylylene diisocyanate; and isocyanate adducts such as a trimethylolpropane/tolylene diisocyanate trimer adduct (Coronate L (trade name) manufactured by Nippon Polyurethane Industry Co., Ltd), a trimethylolpropane/hexamethylene diisocyanate trimer adduct (Coronate HL (trade name) manufactured by Nippon Polyurethane Industry Co., Ltd) and an isocyanurate of hexamethylene diisocyanate (Coronate HX (trade name) manufactured by Nippon Polyurethane Industry Co., Ltd). One or more of these isocyanate compounds may be used singly or in combination.

Examples of epoxy compounds include N,N,N',N'-tetraglycidyl-m-xylenediamine (Tetrad-X (trade mane) manufactured by Mitsubishi Gas Chemical Company, Inc.) and 1,3-bis(N,N-diglycidylaminomethyl)cyclohexane (Tetrad-C (trade name) manufactured by Mitsubishi Gas Chemical Company, Inc.). One or more of these compounds may be used singly or in combination.

The melamine-based resin may be a hexamethylolmelamine. One or more melamine resins may be used singly or in combination.

Examples of the aziridine derivative include a commercially available product trade-named HDU (manufactured by Sogo Pharmaceutical Co., Ltd.), that trade-named TAZM (manufactured by Sogo Pharmaceutical Co., Ltd.), and that trade-named TAZO (manufactured by Sogo Pharmaceutical Co., Ltd.). These compounds may be used or may be used in combination.

The content of the crosslinking agent used in the present invention depends on balance between a (meth)acryl-based polymer to be crosslinked, and is appropriately selected depending on utility as an adhesive sheet. In order to obtain sufficient heat resistance due to a cohesive strength of an acryl adhesive, generally, the crosslinking agent is contained preferably at 0.01 to 15 parts by weight, more preferably 0.5 to 10 parts by weight relative to 100 parts by weight of the (meth) acryl-based polymer. When a content is less than 0.01 part by weight, crosslinking formation due to a crosslinking agent becomes insufficient, a cohesive strength of a pressure sensitive adhesive composition becomes small, and sufficient heat resistance is not obtained in some cases, and there is a tendency that it becomes cause for an adhesive residue. On the other hand, when a content exceeds 15 parts by weight, a cohesive strength of a polymer is great, flowability is reduced, and wetting on an adherend becomes insufficient, and there is a tendency that this becomes cause for peeling. These crosslinking agents may be used or may be used in combination.

In an embodiment of the present invention, a polyfunctional monomer having two or more radiation-reactive unsaturated bonds may be added as a crosslinking agent to the adhesive composition. In this case, the adhesive composition may be crosslinked by application of radiations. A single molecule of the polyfunctional monomer may have two or more radiation-reactive unsaturated bonds derived from one or more radiation-crosslinkable (curable) moieties such as vinyl, acryloyl, methacryloyl, and vinylbenzyl groups. The polyfunctional monomer that may be preferably used generally has 10 or less radiation-reactive unsaturated bonds. One or more of these compounds may be used singly or in combination.

Examples of the polyfunctional monomer include ethylene glycol di(meth)acrylate, diethylene glycol di(meth)acrylate, tetraethylene glycol di(meth)acrylate, neopentylglycol di(meth)acrylate, 1,6-hexanediol di(meth)acrylate, trimethylolpropane tri(meth)acrylate, pentaerythritol tri(meth)acrylate, dipentaerythritol hexa(meth)acrylate, divinylbenzene, and N,N'-methylenebisacrylamide.

The amount of the addition of the polyfunctional monomer may be appropriately selected depending on the balance with the (meth)acrylic polymer to be crosslinked and the use of the adhesive sheet. In order to achieve sufficient heat resistance based on the cohesive strength of the acrylic adhesive, 0.1 to 30 parts by weight of the polyfunctional monomer is preferably blended, based on 100 parts by weight of the (meth) acrylic polymer. In view of flexibility and adhesive property, 10 parts by weight or less of the polyfunctional monomer is preferably blended, based on 100 parts by weight of the (meth)acrylic polymer.

Examples of radiations include ultraviolet rays, laser beams, α rays, β rays, γ rays, X rays, and electron beams. Ultraviolet rays are preferably used, because of their good controllability, handleability, and cost performance. Ultraviolet rays with a wavelength of 200 to 400 nm are more preferably used. Ultraviolet rays may be applied using any appropriate light source such as a high pressure mercury lamp, a microwave-excited lamp and a chemical lamp. When ultraviolet rays are used as radiations, a photopolymerization initiator should be added to the acrylic adhesive.

The photopolymerization initiator may be any material that can produce a radical or a cation, depending on the type of the radiation-reactive component, when ultraviolet rays with an appropriate wavelength capable of inducing the polymerization reaction are applied.

Examples of photoradical polymerization initiators include benzoins such as benzoin, benzoin methyl ether, benzoin ethyl ether, methyl o-benzoylbenzoate-p-benzoin ethyl ether, benzoin isopropyl ether, and α-methylbenzoin; acetophenes such as benzyldimethylketal, trichloroacetophenone, 2,2-diethoxyacetophenone, and 1-hydroxycyclohexyl phenyl ketone; propiophenones such as 2-hydroxy-2-methylpropiophenone and 2-hydroxy-4'-isopropyl-2-methylpropiophenone; benzophenones such as benzophenone, methylbenzophenone, p-chlorobenzophenone, and p-dimethylaminobenzophenone; thioxanthons such as 2-chlorothioxanthon, 2-ethylthioxanthon and 2-isopropylthioxanthon; acylphosphine oxides such as bis(2,4,6-trimethylbenzoyl)-phenylphosphine oxide, 2,4,6-trimethylbenzoyl-diphenylphosphine oxide, and (2,4,6-trimethylbenzoyl)-(ethoxy)-phenylphosphine oxide; and benzil, dibenzsuberone and α-acyloxime ester. One or more of these compounds may be used singly or in combination.

Examples of photocation polymerization initiators include onium salts such as aromatic diazonium salts, aromatic iodonium salts and aromatic sulfonium salts; organometallic complexes such as iron-allene complexes, titanocene complexes and aryl silanol-aluminum complexes; and nitrobenzyl esters, sulfonic acid derivatives, phosphoric acid esters, phenolsulfonic acid esters, diazonaphthoquinone, and N-hydroxyimidosulfonate. One or more of these compounds may be used singly or in combination.

Preferably 0.1 to 10 parts by weight, more preferably 0.2 to 7 parts by weight of the photopolymerization initiatior is blended, based on 100 parts by weight of the (meth)acrylic polymer.

Photo-initiated polymerization aids such as amines may also be used in combination with the initiator. Examples of such photoinitiation aids include 2-dimethylaminoethyl benzoate, dimethylaminoacetophenone, ethyl p-dimethylaminobenzoate, and isoamyl p-dimethylaminobenzoate. One or more of these compounds may be used singly or in combination. Preferably 0.05 to 10 parts by weight, more preferably 0.1 to 7 parts by weight of the polymerization initiation aid is blended, based on 100 parts by weight of the (meth)acrylic polymer.

Further, the adhesive composition used the adhesive sheet of the present invention may contain other known additives, for example, a coloring agent, a pigment, other powder, a surfactant agent, a plasticizer, a tackifier, a low-molecular-weight polymer, a surface lubricant agent, a leveling agent, an antioxidant, a corrosion preventing agent, a photo stabilizer, an ultraviolet absorbing agent, a polymerization inhibitor, a silane coupling agent, and an inorganic or an organic filler, metal powder, granules, foils, and others, which may be added to the adhesive composition used in the adhesive sheet of the present invention depending on utility.

A surfactant may be added to the adhesive composition of the present invention to allow it to have high wetting performance on adherends. In view of interaction with the ionic liquid, the surfactant preferably contains an ether group.

Specific examples of such an ether group-containing surfactant include nonionic surfactants such as polyoxyalkylene fatty acid esters, polyoxyalkylene sorbitan fatty acid esters, polyoxyalkylene sorbitol fatty acid esters, polyoxyalkylene alkyl ethers, polyoxyalkylene alkyl allyl ethers, polyoxyalkylene alkyl phenyl ethers, polyoxyalkylene derivatives, polyoxyalkylene alkylamines, and polyoxyalkylene alkylamine fatty acid esters; anionic surfactants such as polyoxyalkylene alkyl ether sulfates, polyoxyalkylene alkyl ether phosphates, polyoxyalkylene alkyl phenyl ether sulfates, and polyoxyalkylene alkyl phenyl ether phosphates; and alkylene oxide group-containing cationic or amphoteric surfactants. The surfactant may also have a reactive substituent such as a (meth)acryloyl and allyl group in its molecule.

The ether group-containing surfactant more preferably has an ethylene oxide group. Examples of such an ethylene oxide-group containing surfactant include nonionic surfactants such as polyoxyethylene fatty acid esters, polyoxyethylene sorbitan fatty acid esters, polyoxyethylene sorbitol fatty acid esters, polyoxyethylene alkyl ethers, polyoxyethylene alkyl allyl ethers, polyoxyethylene alkyl phenyl ethers, polyoxyethylene derivatives, polyoxyethylene alkylamines, and polyoxyethylene alkylamine fatty acid esters; anionic surfactants such as polyoxyethylene alkyl ether sulfates, polyoxyethylene alkyl ether phosphates, polyoxyethylene alkyl phenyl ether sulfates, and polyoxyethylene alkyl phenyl ether phosphates; andecylene oxide group-containing cationic or amphoteric surfactants. The surfactant may also have a reactive substituent such as acryloyl, methacryloyl and allyl in its molecule.

In view of interaction with the ionic liquid, the alkylene oxide group-containing surfactant preferably has an average oxyalkylene unit addition mole number of 1 to 50, more preferably of 2 to 40. If the surfactant has no alkylene oxide group, it can be not easy to attain a good compatibility balance between the ionic liquid and the base polymer so that bleeding to adherends can tend to undesirably increase. If the surfactant used has an average oxyalkylene unit addition mole number of more than 50, the ionic liquid can be so arrested by the alkylene oxide groups that the antistatic properties can tend to undesirably decrease.

The surfactants may be used singly or in any combination. The amount of the blended surfactant is preferably from 0.01 to 10 parts by weight, more preferably from 0.05 to 5 parts by weight, based on 100 parts by weight of the base polymer. If the amount of the surfactant is less than 0.01 parts by weight, it can be difficult to achieve the effect of increasing wetting performance on adherends. If the amount of the surfactant is more than 10 parts by weight, contamination of adherends can tend to undesirably increase.

The adhesive layer of the present invention is produced by crosslinking the adhesive composition described above. The adhesive sheet of the present invention is produced by forming the adhesive layer on a support (a support film). In this process, the adhesive composition is generally crosslinked after the application of the adhesive composition. Alternatively, however, the adhesive layer formed by crosslinking the adhesive composition may be transferred to a support or the like.

When the photopolymerization initiator is added as an optional component as described above, the adhesive layer may be obtained by applying the adhesive composition directly to a material to be protected or to one or both sides of a supporting material and then irradiating the coating with light. In general, the coating is irradiated with ultraviolet light with a wavelength of 300 to 400 nm in an amount of 200 to 4000 $mJ/cm^2$ under an illumination of 1 to 200 $mW/cm^2$ to form the adhesive layer.

Any method may be used to form the adhesive layer on the film. For example, the adhesive composition is applied to a support (a support film), and the polymerization solvent or the like is removed by drying so that the adhesive layer is formed on the support. Thereafter, the adhesive layer may be subjected to curing for the purpose of controlling a component transfer from the adhesive layer or controlling the crosslinking reaction. When the adhesive composition is applied to a support to form an adhesive sheet, one or more solvents other than the polymerization solvent of the composition may be added such that the composition can be uniformly applied to the support.

As the method for forming the adhesive layer of the invention, there is used a known method used to produce an adhesive sheet, and examples include roll coating, gravure coating, reverse coating, roll brushing, spray coating, and air knife coating methods, and an extrusion coating method with a die coater.

Pressure sensitive adhesive sheets of the present invention are formed such that the thickness of aforementioned adhesive layer is usually 3 to 100 μm, preferably around 5 to 50 μm. The adhesive sheets are such that the aforementioned adhesive layer is coated on one side or both sides of various supports comprising a plastic film such as a polyester film, or a porous material such as a paper and a non-woven fabric to form an aspect of a sheet or a tape. In particular, it is preferable to use a plastic substrate as a support (a support film) in a case of a surface-protecting film.

The support is preferably a plastic substrate having heat resistance, solvent resistance and flexibility. When the support has flexibility, the adhesive composition may be applied using a roll coater or the like, and the support may be wound into a roll.

The plastic substrate is not particularly limited as far as it can be formed into a sheet or a film, and examples include a polyolefin film such as polyethylene, polypropylene, poly-1-butene, poly-4-methyl-1-pentene, an ethylene-propylene copolymer, an ethylene 1-butene copolymer, an ethylene-vinyl acetate copolymer, an ethylene-ethyl acrylate copolymer, and an ethylene-vinyl alcohol copolymer, a polyester film such as polyethylene terephthalate, polyethylene naphthalate, and polybutylene terephthalate, a polyacrylate film, a polystyrene film, a polyamide film such as nylon 6, nylon 6,6, and partially aromatic polyamide, a polyvinyl chloride film, a polyvinylidene chloride film, and a polycarbonate film.

A thickness of the support is usually 5 to 200 µm, preferably around 10 to 100 µm.

The support may be subjected to releasing, or anti-staining with silicone, fluorine, long chain alkyl-based or fatty acid amide-based releasing agent, or a silica powder, easy adhesion treatment such as acid treatment, alkali treatment, primer treatment, corona treatment, plasma treatment, and ultraviolet ray treatment, or coating-type, kneading-type, or deposition-type antistatic treatment, if necessary.

In addition, it is more preferably that a plastic substrate used in the surface-protecting film of the present invention is electrification preventing-treated.

Antistatic treatment which is performed on a plastic substrate is not particularly limited, but for example, a method of providing an electrification preventing layer on at least one side of a generally used film, or a method of kneading a kneading-type electrification preventing agent into a plastic film is used. Examples of a method of providing an electrification preventing layer on at least one side of a substrate include a method of coating an electrification preventing resin comprising an electrification preventing agent and a resin component, or an electrically conductive resin containing an electrically conductive polymer or an electrically conductive substance, and a method of depositing or plating an electrically conductive substance.

Examples of an electrification preventing agent contained in an electrification preventing resin include a cation-type electrification preventing agent having a cationic functional group such as a quaternary ammonium salt, a pyridinium salt, and a primary, secondary or tertiary amino group, an anion-type electrification preventing agent having an anionic functional group such as a sulfonic acid salt, a sulfuric acid ester salt, a phosphonic acid salt, and a phosphoric ester salt, an amphoteric-type electrification preventing agent such as alkylbetain and a derivative thereof, imidazoline and a derivative thereof, and alanine and a derivative thereof, a nonion-type electrification preventing agent such as aminoalcohol and a derivative, glycerin and a derivative thereof, and polyethylene glycol and a derivative thereof, and an ionic electrically conductive polymer obtained by polymerizing or copolymerizing a monomer having the aforementioned cation-type, anion-type, or amphoteric-type ionic electrically conductive group. These compounds may be used alone, or two or more of them may be used by mixing.

Specifically, examples of the cation-type electrification preventing agent include a (meth)acrylate copolymer having a quaternary ammonium group such as an alkyl trimethylammonium salt, an acyloylamidopropyltrimethylammonium methosulfate, an alkylbenzylmethylammonium salt, an acyl choline chloride, and polydimethylaminoethyl methacrylate, a styrene copolymer having a quaternary ammonium group such as polyvinylbenzyltrimethylammonium chloride, and a diallylamine copolymer having a quaternary ammonium group such as polydiallyldimethylammonium chloride. The compounds may be used alone, or two or more kinds may be used by mixing.

Examples of the anion-type electrification preventing agent include an alkyl sulfonic acid salt, an alkylbenzenesulfonic acid salt, an alkyl sulfate ester salt, an alkyl ethoxy sulfate ester salt, an alkyl phosphate ester salt, and a sulfonic acid group-containing styrene copolymer. These compounds may be used alone, or two or more kinds may be used by mixing.

Examples of the amphoteric-type electrification preventing agent include alkylbetain, alkylimidazoliumbetain, and carbobetain grafted copolymer. These compounds may be used alone, or two or more kinds may be used by mixing.

Examples of the nonion-type electrification preventing agent include fatty acid alkylolamide, di(2-hydroxyethyl) alkylamine, polyoxyethylenealkylamine, fatty acid glycerin ester, polyoxyethylene glycol fatty acid ester, sorbitan fatty acid ester, polyoxysorbitan fatty acid ester, polyoxyethylene alkyl phenyl ether, polyoxyethylene alkyl ether, polyethylene glycol, polyoxyethylenediamine, a copolymer consisting of polyether, polyester and polyamide, and methoxypolyethyleneglycol (meth)acrylate. These compounds may be used alone, or two or more kinds may be used by mixing.

Examples of the electrically conductive polymer include polyaniline, polypyrrole and polythiophene. These electrically conductive polymers may be used alone, or two or more kinds may be used by mixing.

Examples of the electrically conductive substance include tin oxide, antimony oxide, indium oxide, cadmium oxide, titanium oxide, zinc oxide, indium, tin, antimony, gold, silver, copper, aluminum, nickel, chromium, titanium, iron, covert, copper iodide, and an alloy and a mixture thereof. These electrically conductive substances may be used alone, or two or more kinds may be used by mixing.

As a resin component used in the electrification preventing resin and the electrically conductive resin, a generally used resin such as polyester, acryl, polyvinyl, urethane, melamine and epoxy is used. In the case of a polymer-type electrification preventing agent, it is not necessary that a resin component is contained. In addition, the electrification preventing resin component may contain compounds of a methylolated or alkylolated melamine series, a urea series, a glyoxal series, and an acrylamide series, an epoxy compound, or an isocyanate compound as a crosslinking agent.

An electrification preventing layer is formed, for example, by diluting the aforementioned electrification preventing resin, electrically conductive polymer or electrically conductive resin with a solvent such as an organic solvent and water, and coating this coating solution on a plastic film, followed by drying.

Examples of an organic solvent used in formation of the electrification preventing layer include methyl ethyl ketone, acetone, ethyl acetate, tetrahydrofuran, dioxane, cyclohexanone, n-hexane, toluene, xylene, methanol, ethanol, n-propanol and isopropanol. These solvents may be used alone, or two or more kinds may be used by mixing.

As a coating method in formation of the electrification preventing layer, the known coating method is appropriately used, and examples include roll coating, gravure coating, reverse coating, roll brushing, spray coating, and air knife coating methods, an immersing and curtain coating method.

A thickness of the aforementioned electrification preventing resin layer, electrically conductive polymer or electrically conductive resin is usually 0.01 to 5 µm, preferably around 0.03 to 1 µm.

Examples of a method of depositing or plating an electrically conductive substance include vacuum deposition, sputtering, ion plating, chemical deposition, spray pyrolysis, chemical plating, and electric plating methods.

A thickness of the electrically conductive substance layer is usually 20 to 10000 Å, preferably 50 to 5000 Å.

As the kneading-type electrification preventing agent, the aforementioned electrification preventing agent is appropriately used. An amount of the kneading-type electrification preventing agent to be blended is 20% by weight or less, preferably in a range of 0.05 to 10% by weight relative to a total weight of a plastic film. A kneading method is not particularly limited as far as it is a method by which the electrification preventing agent can be uniformly mixed into a resin used in a plastic film, but for example, a heating roll, a Banbury mixer, a pressure kneader, and a biaxial kneading machine are used.

If necessary, a separator can be laminated on a surface of a pressure sensitive adhesive for the purpose of protecting a pressure sensitive adhesive surface. As a substrate constituting a separator, there are a paper and a plastic film, and a plastic film is suitably used from a viewpoint of excellent surface smoothness.

The film is not particularly limited as long as the film is a film capable of protecting the adhesive layer. Examples thereof include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

A thickness of the separator is usually around 5 to 200 μm, preferably around 10 to 100 μm. The separator may be subjected to releasing, or anti-staining with silicone, fluorine, long chain alkyl-based or fatty acid amide-based releasing agent, or a silica powder, if necessary.

A pressure sensitive adhesive composition, a pressure sensitive adhesive sheet, and a surface-protecting film employing the present invention are particularly used for plastic products with static electricity easily caused, and above all, they are very useful as surface-protecting film used for protecting a surface of optical member such as a polarizing plate, a retardation plate, a brightness enhancement plate and an antiglare sheet which used in a liquid crystal display.

EXAMPLES

Examples which specifically show a construction and effect of the present invention will be explained below. Assessment items in Examples were measured as follows:

<Measurement of Acid Value>

An acid value was measured using an automatically titrating apparatus (COM-550 manufactured by HIRANUMA SANGYO Co., Ltd.), and was obtained by the following equation.

$$A=\{(Y-X)\times f\times 5.611\}/M$$

A; Acid value

Y; Titration amount of sample solution (ml)

X; Titration amount of solution of only 50 g of mixed solvent (ml)

f; Factor of titration solution

M; Weight of polymer sample (g)

Measurement conditions are as follows:

Sample solution: About 0.5 g of a polymer sample was dissolved in 50 g of a mixed solvent (toluene/2-propanol/distilled water=50/49.5/0.5, weight ratio) to obtain a sample solution.

Titration solution: 0.1N 2-propanolic potassium hydroxide solution (for petroleum product neutralization value test manufactured by Wako Pure Chemical Industries, Ltd.)

Electrode: glass electrode; GE-101, comparative electrode; RE-201,

Measurement mode: petroleum product neutralization value test 1

<Measurement of Molecular Weight>

The weight average molecular weight was measured using a GPC system (HLC-8220GPC manufactured by Tosoh Corporation). The measurement conditions were as follows:

sample concentration; 0.2% by weight (a THF solution)

sample injection amount; 10 μl eluent; THF flow rate; 0.6 ml/min measurement temperature; 40° C.

sample columns; TSK guard column Super HZ-H (one)+TSK gel Super HZM-H (two)

reference column; TSK gel Super H-RC (one)

detector; a differential refractometer (RI).

The weight average molecular weight was determined as a polystyrene-equivalent molecular weight.

<Measurement of Glass Transition Temperature>

The glass transition temperature (Tg) (° C.) was determined with a dynamic viscoelasticity measurement system (ARES manufactured by Rheometric Scientific Inc.) by the method described below.

An about 2 mm-thick laminate of (meth)acrylic polymer sheets (each with a thickness of 20 μm) was prepared and stamped into 7.9 mmφ pieces. The resulting cylindrical pellets were used as samples for glass transition temperature measurement.

The sample was fixed on a 7.9 mmφ parallel plate tool and measured for the temperature dependence of the loss modulus G" in the dynamic viscoelasticity measurement system. The temperature at which the resulting G" curve was maximal was defined as the glass transition temperature (° C.).

The measurement conditions were as follows:

Measurement; shear mode temperature range; −70° C.~150° C.

rate of temperature increase; 5° C./min frequency; 1 Hz.

<Structural Analysis of Ionic Liquid>

The structural analysis of the ionic liquid was performed by NMR measurement, XRF measurement and FT-IR measurement.

[NMR Measurement]

The NMR measurement was performed with a nuclear magnetic resonance apparatus (EX-400 manufactured by JEOL Ltd.) under the following conditions: measurement frequency, 400 MHz ($^1$H), 100 MHz ($^{13}$C); measurement solvent, acetone-$d_6$; measurement temperature, 23° C.

[XRF Measurement]

The XRF measurement was performed with a scanning X-ray fluorescence analyzer (ZSX-100e manufactured by Rigaku Corporation) under the following conditions: measurement method, filter paper method; X-ray source, Rh.

[FT-IR Measurement]

The FT-IR measurement was performed with an infrared spectrophotometer (Magna-560 manufactured by Nicolet) under the following conditions:
measurement method; ATR method
detector; DTGS
resolution; 4.0 cm$^{-1}$
integrated number; 64 scans Preparation of (Meth)acrylic Polymers Acrylic Polymer (A)

To a four-neck flask equipped with a stirring blade, a thermometer, a nitrogen gas introducing tube, and a condenser were added 200 parts by weight of 2-ethylhexyl acrylate, 8 parts by weight of 2-hydroxypropyl acrylate 25 (Light Ester HOP-A manufactured by Kyoeisha Chemical Co., Ltd.), 0.4 parts by weight of 2,2'-azobisisobutyronitrile as a polymerization initiator, and 386.3 parts by weight of ethyl acetate. Nitrogen gas was introduced to the mixture, while the mixture was gently stirred, and a polymerization reaction was performed for 5 hours, while the temperature of the liquid in the flask 30 was kept at about 60° C., so that a solution of an acrylic polymer (named Acrylic Polymer (A))(35% by weight) was prepared. Acrylic Polymer (A) had a weight average molecular weight of 400,000, a glass transition temperature (Tg) of −55° C. and an acid value of 0.0.

(Acryl-Based Polymer (B))

To a four-neck flask equipped with a stirring blade, a thermometer, a nitrogen gas introducing tube, and a condenser were added 200 parts by weight of 2-ethylhexyl acrylate, 8 parts by weight of 2-hydroxybutyl acrylate (Light Ester HOB-A manufactured by Kyoeisha Chemical Co., Ltd.), 0.4 parts by weight of 2,2'-azobisisobutyronitrile as a polymerization initiator, and 386.3 parts by weight of ethyl acetate. Nitrogen gas was introduced to the mixture, while the mixture was gently stirred, and a polymerization reaction was performed for 5 hours, while the temperature of the liquid in the flask was kept at about 60° C., so that a solution of an acrylic polymer (named Acrylic Polymer (B)) (35% by weight) was prepared. Acrylic Polymer (B) had a weight average molecular weight of 410,000, a glass transition temperature (Tg) of −56° C. and an acid value of 0.0.

(Acryl-Based Polymer (C))

To a four-neck flask equipped with a stirring blade, a thermometer, a nitrogen gas introducing tube, and a condenser were added 200 parts by weight of 2-ethylhexyl acrylate, 8 parts by weight of 4-hydroxybutyl acrylate (4-HBA manufactured by Osaka Organic Chemical Industry Co., Ltd.), 0.4 parts by weight of 2,2'-azobisisobutyronitrile as a polymerization initiator, and 312 parts by weight of ethyl acetate. Nitrogen gas was introduced to the mixture, while the mixture was gently stirred, and a polymerization reaction was performed for 5 hours, while the temperature of the liquid in the flask was kept at about 60° C., so that a solution of an acrylic polymer (named Acrylic Polymer (C)) (40% by weight) was prepared. Acrylic Polymer (C) had a weight average molecular weight of 560,000, a glass transition temperature (Tg) of −56° C. and an acid value of 0.0.

Acrylic Polymer (D)

To a four-neck flask equipped with a stirring blade, a thermometer, a nitrogen gas introducing tube, and a condenser were added 199 parts by weight of 2-ethylhexyl acrylate, 1 part by weight of an alkylene oxide group-containing reactive surfactant (Latemul PD-420 manufactured by Kao Corporation), 8 parts by weight of 4-hydroxybutyl acrylate (4-HBA manufactured by Osaka Organic Chemical Industry Ltd.), 0.4 parts by weight of 2,2'-azobisisobutyronitrile as a polymerization initiator, and 312 parts by weight of ethyl acetate. Nitrogen gas was introduced to the mixture, while the mixture was gently stirred, and a polymerization reaction was performed for 5 hours, while the temperature of the liquid in the flask was kept at about 60° C., so that a solution of an acrylic polymer (named Acrylic Polymer (D)) (40% by weight) was prepared. Acrylic Polymer (D) had a weight average molecular weight of 580,000, a glass transition temperature (Tg) of −56° C. and an acid value of 0.0.

(Acryl-Based Polymer (E))

To a four-neck flask equipped with a stirring blade, a thermometer, a nitrogen gas introducing tube, and a condenser were added 200 parts by weight of 2-ethylhexyl acrylate, 16 parts by weight of 2-hydroxypropyl acrylate (Light Ester HOP-A manufactured by Kyoeisha Chemical Co., Ltd.), 0.44 parts by weight of 2,2'-azobisisobutyronitrile as a polymerization initiator, and 401.1 parts by weight of ethyl acetate. Nitrogen gas was introduced to the mixture, while the mixture was gently stirred, and a polymerization reaction was performed for 5 hours, while the temperature of the liquid in the flask was kept at about 60° C., so that a solution of an acrylic polymer (named Acrylic Polymer (E)) (35% by weight) was prepared. Acrylic Polymer (E) had a weight average molecular weight of 410,000, a glass transition temperature (Tg) of −53° C. and an acid value of 0.0.

(Acryl-Based Polymer (F))

To a four-neck flask equipped with a stirring blade, a thermometer, a nitrogen gas introducing tube, and a condenser were added 200 parts by weight of 2-ethylethyl acrylate, 8 parts by weight of 2-hydroxyethyl acrylate, 0.4 parts by weight of 2,2'-azobisisobutyronitrile as a polymerization initiator, and 312 parts by weight of ethyl acetate. Nitrogen gas was introduced to the mixture, while the mixture was gently stirred, and a polymerization reaction was performed for 5 hours, while the temperature of the liquid in the flask was kept at about 60° C., so that a solution of an acrylic polymer (named Acrylic Polymer (F))(40% by weight) was prepared. Acrylic Polymer (F) had a weight average molecular weight of 550,000, a glass transition temperature (Tg) of −55° C. and an acid value of 0.0.

(Acryl-Based Polymer (G))

To a four-neck flask equipped with a stirring blade, a thermometer, a nitrogen gas introducing tube, and a condenser were added 199 parts by weight of 2-ethylhexyl acrylate, 1 part by weight of an alkylene oxide group-containing reactive surfactant (Latemul PD-420 manufactured by Kao Corporation), 8 parts by weight of 2-hydroxypropyl acrylate (Light Ester HOP-A manufactured by Kyoeisha Chemical Co., Ltd.), 0.4 parts by weight of 2,2'-azobisisobutyronitrile as a polymerization initiator, and 312 parts by weight of ethyl acetate. Nitrogen gas was introduced to the mixture, while the mixture was gently stirred, and a polymerization reaction was performed for 5 hours, while the temperature of the liquid in the flask was kept at about 60° C., so that a solution of an acrylic polymer (named Acrylic Polymer (G)) (40% by weight) was prepared. Acrylic Polymer (G) had a weight average molecular weight of 560,000, a glass transition temperature (Tg) of −55° C. and an acid value of 0.0.

(Acryl-Based Polymer (H))

To a four-neck flask equipped with a stirring blade, a thermometer, a nitrogen gas introducing tube, and a condenser were added 199 parts by weight of 2-ethylhexyl acrylate, 1 part by weight of an alkylene oxide group-containing reactive surfactant (Latemul PD-420 manufactured by Kao Corporation), 8 parts by weight of 2-hydroxybutyl acrylate (Light Ester HOB-A manufactured by Kyoeisha Chemical Co., Ltd.), 0.4 parts by weight of 2,2'-azobisisobutyronitrile as a polymerization initiator, and 312 parts by weight of ethyl acetate. Nitrogen gas was introduced to the mixture, while the mixture was gently stirred, and a polymerization reaction was performed for 5 hours, while the temperature of the liquid in the flask was kept at about 60° C., so that a solution of an acrylic polymer (named Acrylic Polymer (H)) (40% by weight) was prepared. Acrylic Polymer (H) had a weight average molecular weight of 560,000, a glass transition temperature (Tg) of −56° C. and an acid value of 0.0.

<Preparation of Ionic Liquid>

Ionic Liquid (1)

An aqueous solution prepared by diluting 10 parts by weight of 1-butyl-3-methylpyridinium chloride (manufactured by Wako Pure Chemical Industries, Ltd.) to 20% by weight with distilled water was added to a four-neck flask equipped with a stirring blade, a thermometer and a condenser. While the stirring blade was rotated, an aqueous solution prepared by diluting 19 parts by weight of lithium bis(trifluoromethanesulfonyl)imide (manufactured by Kishida Chemical Co., Ltd.) to 20% by weight with distilled water was gradually added to the mixture. After the addition was completed, the mixture was stirred at 25° C. for 2 hours and then allowed to stand for 12 hours. The supernatant fluid was then removed so that a liquid product was obtained.

The obtained liquid product was washed with 200 parts by weight of distilled water three times and then subjected to drying under an environment at 110° C. for 2 hours to give 20 parts by weight of an ionic liquid (named Ionic Liquid (1)) which was in a liquid state at 25° C.

The resulting Ionic Liquid (1) was subjected to NMR ($^1$H, $^{13}$C) measurement, FT-IR measurement and XRF measurement and identified and confirmed as 1-butyl-3-methylpyridinium bis(trifluoromethanesulfonyl)imide.

<Preparation of Antistatic Agent Solution>

(Antistatic Agent Solution (a))

Ten parts by weight of the ionic liquid (1) and 90 parts by weight of ethyl acetate were added to a four-neck flask equipped with a stirring blade, a thermometer and a condenser. Mixing and stirring were performed for 30 minutes, while the temperature of the liquid in the flask was kept at about 25° C., so that an antistatic agent solution (a) (10% by weight) was prepared.

(Antistatic Agent Solution (b))

Ten parts by weight of an aliphatic amine ionic liquid (IL-A5 (in a liquid state at 25° C.) manufactured by Koei Chemical Company Limited) and 90 parts by weight of ethyl acetate were charged in a four-neck flask equipped with a stirring blade, a thermometer and a condenser. Mixing and stirring were performed for 30 minutes, while the temperature of the liquid in the flask was kept at about 25° C., so that an antistatic agent solution (b) (10% by weight) was prepared.

(Antistatic Agent Solution (c))

0.1 parts by weight of lithium iodide, 7.9 parts by weight of polypropylene glycol (diol type, 2000 in number average molecular weight) and 32 parts by weight of ethyl acetate were added to a four-neck flask equipped with a stirring blade, a thermometer and a condenser. Mixing and stirring were performed for 2 hours, while the temperature of the liquid in the flask was kept at about 80° C., so that an antistatic agent solution (c) (20% by weight) was prepared.

(Antistatic Agent Solution (d))

Ten parts by weight of an alicyclic amine ionic liquid (IL-C1 (in a liquid state at 25° C.) manufactured by Koei Chemical Company Limited) and 90 parts by weight of ethyl acetate were charged in a four-neck flask equipped with a stirring blade, a thermometer and a condenser. Mixing and stirring were performed for 30 minutes, while the temperature of the liquid in the flask was kept at about 25° C., so that an antistatic agent solution (d) (10% by weight) was prepared.

<Preparation of Antistatic-Treated Film>

Ten parts by weight of an antistatic agent (Microsolver RMd-142 mainly composed of tin oxide and polyester resin, manufactured by Solvex Co., LTD) was diluted with a mixed solvent of 30 parts by weight of water and 70 parts by weight of methanol to form an antistatic agent solution.

The resulting antistatic agent solution was applied to a polyethylene terephthalate (PET) film (38 μm in thickness) with a Meyer bar and dried at 130° C. for one minute to form an antistatic layer (0.2 μm in thickness) by removing the solvent, so that an antistatic-treated film was prepared.

Example 1

Preparation of Adhesive Solution

The Acrylic Polymer (A) solution (35% by weight) was diluted to 20% by weight with ethyl acetate. To 100 parts by weight of the resulting solution were added 2 part by weight of the antistatic agent solution (a) (10% by weight), 0.4 parts by weight of an isocyanurate of hexamethylene diisocyanate (Coronate HX manufactured by Nippon Polyurethane Industry Co., Ltd) as a crosslinking agent, and 0.4 parts by weight of dibutyltin dilaurate (a 1% by weight ethyl acetate solution) as a crosslinking catalysis, and mixing and stirring were performed at room temperature (25° C.) for about one minute so that an acrylic adhesive solution (1) was prepared.

(Production of Adhesive Sheet)

The acryl adhesive solution (1) was applied on the opposite surface of the above-mentioned antistatic-treated film to the antistatic-treated surface, and heated at a temperature of 130° C. for 2 minutes to form a pressure sensitive adhesive layer having a thickness of 20 μm. Subsequently, the silicone-treated surface of a 25 μm-thick polyethylene terephthalate film whose one side had been silicone-treated was attached to the surface of the adhesive layer, and then the resulting laminate was cured at 50° C. for 2 days to give a pressure sensitive adhesive sheet.

Example 2

Preparation of Adhesive Solution

The Acrylic Polymer (B) solution (35% by weight) was diluted to 20% by weight with ethyl acetate. To 100 parts by weight of the resulting solution were added 2 part by weight of the antistatic agent solution (b) (10% by weight), 0.4 parts by weight of an isocyanurate of hexamethylene diisocyanate (Coronate HX manufactured by Nippon Polyurethane Industry Co., Ltd) as a crosslinking agent, and 0.4 parts by weight of dibutyltin dilaurate (a 1% by weight ethyl acetate solution) as a crosslinking catalysis, and mixing and stirring were performed at room temperature (25° C.) for about one minute so that an acrylic adhesive solution (2) was prepared.

<Preparation of Adhesive Sheet>

A pressure sensitive adhesive sheet was prepared using the process of Example 1, except that the acrylic adhesive solution (2) was used in place of the acrylic adhesive solution (1).

Example 3

Preparation of Adhesive Solution

The Acrylic Polymer (C) solution (40% by weight) was diluted to 20% by weight with ethyl acetate. To 100 parts by weight of the resulting solution were added 2 part by weight of the antistatic agent solution (a) (10% by weight), 0.4 parts by weight of an isocyanurate of hexamethylene diisocyanate (Coronate HX manufactured by Nippon Polyurethane Industry Co., Ltd) as a crosslinking agent, and 0.4 parts by weight of dibutyltin dilaurate (a 1% by weight ethyl acetate solution) as a crosslinking catalysis, and mixing and stirring were performed at room temperature (25° C.) for about one minute so that an acrylic adhesive solution (3) was prepared.

<Preparation of Adhesive Sheet>

A pressure sensitive adhesive sheet was prepared using the process of Example 1, except that the acrylic adhesive solution (3) was used in place of the acrylic adhesive solution (1).

Example 4

Preparation of Adhesive Solution

The Acrylic Polymer (D) solution (40% by weight) was diluted to 20% by weight with ethyl acetate. To 100 parts by weight of the resulting solution were added 2 part by weight of the antistatic agent solution (a) (10% by weight), 0.4 parts by weight of an isocyanurate of hexamethylene diisocyanate (Coronate HX manufactured by Nippon Polyurethane Industry Co., Ltd) as a crosslinking agent, and 0.4 parts by weight of dibutyltin dilaurate (a 1% by weight ethyl acetate solution) as a crosslinking catalysis, and mixing and stirring were performed at room temperature (25° C.) for about one minute so that an acrylic adhesive solution (4) was prepared.

<Preparation of Adhesive Sheet>

A pressure sensitive adhesive sheet was prepared using the process of Example 1, except that the acrylic adhesive solution (4) was used in place of the acrylic adhesive solution (1).

Example 5

Preparation of Adhesive Solution

The Acrylic Polymer (E) solution (35% by weight) was diluted to 20% by weight with ethyl acetate. To 100 parts by weight of the resulting solution were added 2 part by weight of the antistatic agent solution (a) (10% by weight), 0.4 parts by weight of an isocyanurate of hexamethylene diisocyanate (Coronate HX manufactured by Nippon Polyurethane Industry Co., Ltd) as a crosslinking agent, and 0.4 parts by weight of dibutyltin dilaurate (a 1% by weight ethyl acetate solution) as a crosslinking catalysis, and mixing and stirring were performed at room temperature (25° C.) for about one minute so that an acrylic adhesive solution (5) was prepared.

<Preparation of Adhesive Sheet>

A pressure sensitive adhesive sheet was prepared using the process of Example 1, except that the acrylic adhesive solution (5) was used in place of the acrylic adhesive solution (1).

Example 6

Preparation of Adhesive Solution

The Acrylic Polymer (E) solution (35% by weight) was diluted to 20% by weight with ethyl acetate. To 100 parts by weight of the resulting solution were added 2 part by weight of the antistatic agent solution (b) (10% by weight), 0.4 parts by weight of an isocyanurate of hexamethylene diisocyanate (Coronate HX manufactured by Nippon Polyurethane Industry Co., Ltd) as a crosslinking agent, and 0.4 parts by weight of dibutyltin dilaurate (a 1% by weight ethyl acetate solution) as a crosslinking catalysis, and mixing and stirring were performed at room temperature (25° C.) for about one minute so that an acrylic adhesive solution (6) was prepared.

<Preparation of Adhesive Sheet>

A pressure sensitive adhesive sheet was prepared using the process of Example 1, except that the acrylic adhesive solution (6) was used in place of the acrylic adhesive solution (1).

Comparative Example 1

Preparation of Adhesive Solution

The Acrylic Polymer (F) solution (40% by weight) was diluted to 20% by weight with ethyl acetate. To 100 parts by weight of the resulting solution were added 2 part by weight of the antistatic agent solution (a) (10% by weight), 0.4 parts by weight of an isocyanurate of hexamethylene diisocyanate (Coronate HX manufactured by Nippon Polyurethane Industry Co., Ltd) as a crosslinking agent, and 0.4 parts by weight of dibutyltin dilaurate (a 1% by weight ethyl acetate solution) as a crosslinking catalysis, and mixing and stirring were performed at room temperature (25° C.) for about one minute so that an acrylic adhesive solution (7) was prepared.

<Preparation of Adhesive Sheet>

A pressure sensitive adhesive sheet was prepared using the process of Example 1, except that the acrylic adhesive solution (7) was used in place of the acrylic adhesive solution (1).

Comparative Example 2

Preparation of Adhesive Solution

The Acrylic Polymer (F) solution (40% by weight) was diluted to 20% by weight with ethyl acetate. To 100 parts by weight of the resulting solution were added 2.0 parts by weight of an anionic surfactant of sodium dialkylsulfosuccinate (Neocoal SW manufactured by Dai-ichi Kogyo Seiyaku Co., Ltd. (a 100% product produced by removing the solvent from a 29% by weight solution)), 0.3 parts by weight of an isocyanurate of hexamethylene diisocyanate (Coronate HX manufactured by Nippon Polyurethane Industry Co., Ltd) as a crosslinking agent, and 0.4 parts by weight of dibutyltin dilaurate (a 1% by weight ethyl acetate solution) as a crosslinking catalysis, and mixing and stirring were performed at room temperature (25° C.) for about one minute so that an acrylic adhesive solution (8) was prepared.

<Preparation of Adhesive Sheet>

A pressure sensitive adhesive sheet was prepared using the process of Example 1, except that the acrylic adhesive solution (8) was used in place of the acrylic adhesive solution (1).

Comparative Example 3

Preparation of Adhesive Solution

The Acrylic Polymer (F) solution (40% by weight) was diluted to 20% by weight with ethyl acetate. To 100 parts by weight of the resulting solution were added 8 part by weight of the antistatic agent solution (c) (20% by weight), 0.3 parts by weight of an isocyanurate of hexamethylene diisocyanate (Coronate HX manufactured by Nippon Polyurethane Industry Co., Ltd) as a crosslinking agent, and 0.4 parts by weight of dibutyltin dilaurate (a 1% by weight ethyl acetate solution) as a crosslinking catalysis, and mixing and stirring were performed at room temperature (25° C.) for about one minute so that an acrylic adhesive solution (9) was prepared.

<Preparation of Adhesive Sheet>

A pressure sensitive adhesive sheet was prepared using the process of Example 1, except that the acrylic adhesive solution (9) was used in place of the acrylic adhesive solution (1).

Comparative Example 4

Preparation of Adhesive Solution

The Acrylic Polymer (B) solution (35% by weight) was diluted to 20% by weight with ethyl acetate. To 100 parts by weight of the resulting solution were added 8 part by weight of the antistatic agent solution (c) (20% by weight), 0.4 parts by weight of an isocyanurate of hexamethylene diisocyanate (Coronate HX manufactured by Nippon Polyurethane Industry Co., Ltd) as a crosslinking agent, and 0.4 parts by weight of dibutyltin dilaurate (a 1% by weight ethyl acetate solution) as a crosslinking catalysis, and mixing and stirring were performed at room temperature (25° C.) for about one minute so that an acrylic adhesive solution (10) was prepared.

<Preparation of Adhesive Sheet>

A pressure sensitive adhesive sheet was prepared using the process of Example 1, except that the acrylic adhesive solution (10) was used in place of the acrylic adhesive solution (1).

Example 7

Preparation of Adhesive Solution

The Acrylic Polymer (G) solution (40% by weight) was diluted to 20% by weight with ethyl acetate. To 100 parts by weight of the resulting solution were added 2 part by weight of the antistatic agent solution (a) (10% by weight), 0.4 parts by weight of an isocyanurate of hexamethylene diisocyanate (Coronate HX manufactured by Nippon Polyurethane Industry Co., Ltd) as a crosslinking agent, and 0.4 parts by weight of dibutyltin dilaurate (a 1% by weight ethyl acetate solution) as a crosslinking catalysis, and mixing and stirring were performed at room temperature (25° C.) for about one minute so that an acrylic adhesive solution (11) was prepared.

<Preparation of Adhesive Sheet>

A pressure sensitive adhesive sheet was prepared using the process of Example 1, except that the acrylic adhesive solution (11) was used in place of the acrylic adhesive solution (1).

Example 8

Preparation of Adhesive Solution

The Acrylic Polymer (H) solution (40% by weight) was diluted to 20% by weight with ethyl acetate. To 100 parts by weight of the resulting solution were added 0.8 part by weight of the antistatic agent solution (d) (10% by weight), 0.4 parts by weight of an isocyanurate of hexamethylene diisocyanate (Coronate HX manufactured by Nippon Polyurethane Industry Co., Ltd) as a crosslinking agent, and 0.4 parts by weight of dibutyltin dilaurate (a 1% by weight ethyl acetate solution) as a crosslinking catalysis, and mixing and stirring were performed at room temperature (25° C.) for about one minute so that an acrylic adhesive solution (12) was prepared.

<Preparation of Adhesive Sheet>

A pressure sensitive adhesive sheet was prepared using the process of Example 1, except that the acrylic adhesive solution (12) was used in place of the acrylic adhesive solution (1).

Comparative Example 5

Preparation of Adhesive Solution

The Acrylic Polymer (F) solution (40% by weight) was diluted to 20% by weight with ethyl acetate. To 100 parts by weight of the resulting solution were added 0.8 part by weight of the antistatic agent solution (d) (10% by weight), 0.4 parts by weight of an isocyanurate of hexamethylene diisocyanate (Coronate HX manufactured by Nippon Polyurethane Industry Co., Ltd) as a crosslinking agent, and 0.4 parts by weight of dibutyltin dilaurate (a 1% by weight ethyl acetate solution) as a crosslinking catalysis, and mixing and stirring were performed at room temperature (25° C.) for about one minute so that an acrylic adhesive solution (13) was prepared.

<Preparation of Adhesive Sheet>

A pressure sensitive adhesive sheet was prepared using the process of Example 1, except that the acrylic adhesive solution (13) was used in place of the acrylic adhesive solution (1).

Regarding adhesive sheets obtained in the aforementioned Examples and Comparative Examples, a peeling electrification voltage, staining property and an adhesive strength were assessed under the following conditions.

<Measurement of Peeling Electrification Voltage>

The adhesive sheet was cut into a size of a width of 70 mm and a length of 130 mm to peel a separator thereof, which sheet was thereafter adhered by a hand roller on the surface of a polarizing plate (SEG1425WVAGS2B, manufactured by Nitto Denko Corporation, width: 70 mm, length: 100 mm) stuck to the acrylic plate previously destaticized (ACRYLITE, manufactured by MITSUBISHI RAYON Co., Ltd., thickness: 1 mm, width: 70 mm, length: 100 mm) so that one end thereof protruded by 30 mm.

After being left under an environment of 23° C. and 50% RH for one day, the sample was set in a predetermined position as shown in FIG. 1. The one end protruding by 30 mm was fixed in an automatic wind-up machine and peeled off so as to have a peeling angle of 150° and a peeling rate of 10 m/min. Electric potential on the polarizing plate surface, which then occurred, were measured by an electrostatic voltmeter (KSD-0103, manufactured by Kasuga Electric Works Ltd.) fixed in the central position in the lengthwise direction of the sample. The measurement was performed under an environment of 23° C. and 50% RH.

<Evaluation of Staining Property>

The produced pressure sensitive adhesive sheet was cut into a size of a width of 50 mm and a length of 80 mm to peel a separator thereof, which sheet was thereafter adhered by a hand roller trapping air to create bubble on the surface of a polarizing plate (SEG1425WVAGS2B, manufactured by Nitto Denko Corporation, width: 70 mm, length: 100 mm) to produce an evaluation sample.

The sample was allowed to stand for 24 hours under the environment of 50° C.×92% RH and, thereafter, the pressure sensitive adhesive sheet was peeled from the adherend by a hand, and the state of staining, and the trace of air bubble of an adherend surface were observed with naked eyes. Assessment criteria were such that the case of observation of non staining was ○, and the case of observation of staining was x.

<Measurement of Adhesive Strength>

The produced pressure sensitive adhesive sheet was cut into a size of a width of 25 mm and a length of 100 mm to peel a separator thereof, which sheet was thereafter laminated at a pressure of 0.25 MPa on a polarizing plate (SEG1425DU, manufactured by Nitto Denko Corporation, width: 70 mm, length: 100 mm) to produce an evaluation sample.

After being laminated and then left under an environment of 23° C. and 50% RH for 30 minutes, adhesive strength in peeling off at a peeling rate of 10 m/min and a peeling angle of 180° was measured by a tensile tester. The measurement was performed under an environment of 23° C. and 50% RH.

The above-mentioned results are shown in Table 1.

TABLE 1

|  | peeling electrification voltage (kV) | staining property (–) | adhesive strength (N/25 mm) |
|---|---|---|---|
| Example 1 | 0.0 | ○ | 1.1 |
| Example 2 | −0.1 | ○ | 1.0 |
| Example 3 | −0.1 | ○ | 1.0 |
| Example 4 | −0.1 | ○ | 0.9 |
| Example 5 | −0.1 | ○ | 1.4 |
| Example 6 | 0.0 | ○ | 1.4 |
| Example 7 | 0.0 | ○ | 1.2 |
| Example 8 | −0.5 | ○ | 1.2 |
| Comparative Example 1 | −0.1 | x | 0.9 |
| Comparative Example 2 | 0.0 | x | 1.1 |
| Comparative Example 3 | −0.1 | x | 0.2 |
| Comparative Example 4 | −0.2 | x | 0.4 |
| Comparative Example 5 | 0.0 | x | 1.0 |

Through the above-mentioned results in Table 1, it was clarified that in the case (examples 1 to 8) of using the adhesive composition produced according to the present invention, any of the examples was demonstrated that the absolute value of the peeling electrification voltage to the polarizing plate was suppressed to a low value of 0.5 kV or less and that the polarizing plate had no staining.

In contrast, when the adhesive composition used did not contain the $C_3$-$C_{12}$ hydroxyalkyl group-containing (meth) acrylate eater as a monomer unit (Comparative Examples 1 to 3 and 5) and when the adhesive composition used contained the $C_3$-$C_{12}$ hydroxyalkyl group-containing (meth)acrylate eater as a monomer unit but did not contain the ionic liquid (Comparative Example 4), staining was observed, although the peeling electrification voltage was suppressed. As a result, it was demonstrated that the adhesive composition of Comparative Examples 1 to 5 were unfavorable for antistatic adhesive sheets, because the peeling electrification voltage to the polarizing plate and the staining of the adherend were not suppressed at the same time with any of the adhesive sheets of Comparative Examples 1 to 5.

It has also been found that each of the adhesive sheets of Examples 1 to 8 has a 180° peel strength in the range of 0.1 to 6 N/25 mm at a peel rate of 10 m/min and thus is suitable for releasable surface-protecting films.

Therefore, it has been demonstrated that the adhesive composition of the present invention can have good antistatic properties when peeled from adherends, low staining of adherends, and a high level of adhesion reliability.

The invention claimed is:

1. A pressure sensitive adhesive composition, comprising: an ionic liquid; and a polymer containing, as a monomer unit, 0.1 to 10% by weight of a (meth)acrylate ester with a hydroxyalkyl group having 3 to 12 carbon atoms, wherein the polymer has an acid value of 1 or less.

2. The adhesive composition according to claim 1, wherein the ionic liquid is at least one of a nitrogen-containing onium salt, a sulfur-containing onium salt and a phosphorus-containing onium salt.

3. The adhesive composition according to claim 1, wherein the ionic liquid contains at least one of cations represented by Formulae (A) to (D):

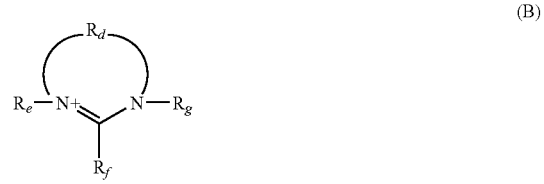

wherein:

in the formula (A), $R_a$ represents a hydrocarbon group of a carbon number of 4 to 20, and may contain a hetero atom, and $R_b$ and $R_c$ are the same or different, represent hydrogen or a hydrocarbon group of a carbon number of 1 to 16, and may contain a hetero atom, provided that, when a nitrogen atom contains a double bond, $R_c$ is not present;

in the formula (B), $R_d$ represents a hydrocarbon group of a carbon number of 2 to 20, and may contain a hetero atom, and $R_e$, $R_f$ and $R_g$ are the same or different, represent hydrogen or a hydrocarbon group of a carbon number of 1 to 16, and may contain a hetero atom;

in the formula (C), $R_h$ represents a hydrocarbon group of a carbon number of 2 to 20, and may contain a hetero atom, and $R_i$, $R_j$ and $R_k$ are the same or different, represent a hydrogen or a hydrocarbon group of a carbon number of 1 to 16, and may contain a hetero atom; and in the formula (D), Z represents a nitrogen atom, a sulfur atom, or a phosphorus atom, and $R_l$, $R_m$, $R_n$ and $R_o$ are the same or different, represent a hydrocarbon group of a carbon number of 1 to 20, and may contain a hetero atom, provided that, when Z is a sulfur atom, $R_o$ is not present.

4. A pressure sensitive adhesive layer comprising an adhesive composition crosslinked, wherein the pressure sensitive adhesive composition comprises: an ionic liquid; and a polymer containing, as a monomer unit, 0.1 to 10% by weight of a (meth)acrylate ester with a hydroxyalkyl group having 3 to 12 carbon atoms, wherein the polymer has an acid value of 1 or less.

5. A pressure sensitive adhesive sheet comprising a support, and the adhesive layer according to claim 4 is formed on one side or both sides of a support.

6. A surface-protecting film comprising a support made of an antistatic treated plastic substrate, and the adhesive layer according to claim 4 is formed on one side or both sides of the support.

7. A pressure sensitive adhesive composition having antistatic property and low staining property, comprising: a polymer containing, as a monomer unit, 0.1 to 10% by weight of a (meth)acrylate ester with a hydroxyalkyl group having 3 to 12 carbon atoms, wherein the polymer has an acid value of 1 or less; and 0.1 to 10 parts by weight with respect to 100 parts by weight of the polymer of an ionic liquid.

8. The pressure-sensitive adhesive composition according to claim 7, wherein the polymer comprises 60 to 99.9% by weight of one or more (meth)acrylate units having an alkyl group of 1 to 14 carbon atoms.

9. The pressure-sensitive adhesive composition according to claim 7, wherein the acid value of the (meth)acrylic polymer is 29 or less.

10. The pressure-sensitive adhesive composition according to claim 7, wherein the polymer comprises a monomer having an alkylene oxide group, wherein the average mole number of oxyalkylene unit in the monomer is 3 to 40.

11. The pressure sensitive adhesive layer according to claim 4, wherein the polymer has a weight average molecular weight in the range of about 100,000 to about 580,000 Da.

12. The pressure sensitive adhesive layer according to claim 4, wherein, upon peeling the pressure sensitive adhesive layer from a polarizing plate, electrification is prevented.

13. The pressure sensitive adhesive layer according to claim 4, wherein, upon peeling the pressure sensitive adhesive layer from a polarizing plate, staining is prevented.

14. The pressure sensitive adhesive layer according to claim 4, wherein the pressure sensitive adhesive has an absolute value of peeling electrification of 0.5 kV or less upon peeling the pressure sensitive adhesive layer from a polarizing plate.

15. The pressure sensitive adhesive layer according to claim 13, wherein the pressure sensitive adhesive has an absolute value of peeling electrification of 0.5 kV or less upon peeling the pressure sensitive adhesive layer from a polarizing plate.

* * * * *

UNITED STATES PATENT AND TRADEMARK OFFICE
CERTIFICATE OF CORRECTION

PATENT NO. : 7,799,853 B2
APPLICATION NO. : 12/065652
DATED : September 21, 2010
INVENTOR(S) : Natsuki Ukei et al.

It is certified that error appears in the above-identified patent and that said Letters Patent is hereby corrected as shown below:

(Item 56), Page 2, Column 2, line 15; Under U.S. PATENT DOCUMENTS, please delete "6,939,911 B2 9/2005 Tosaki et al." and insert --6,393,911 B2 9/2005 Tosaki et al.--, therefor.

(Item 56), Page 3, Column 1, line 8; Under Other Publications, please delete "Birkhäser" and insert --Birkhäuser--, therefor.

Column 9, line 56; please delete "$R_c$," and insert --$R_e$,--, therefor.

Column 10, line 22; please delete "1-penthyl" and insert --1-pentyl--, therefor.

Column 10, line 23; please delete "1-hepthyl" and insert --1-heptyl.--, therefor.

Column 10, line 23; please delete "1-oethyl" and insert --1-octyl--, therefor.

Column 11, line 16; please delete "methylmidazolium" and insert --methylimidazolium--, therefor.

Column 11, line 17; please delete "methylmidazolium" and insert --methylimidazolium--, therefor.

Column 11, line 19; please delete "ocytl" and insert --octyl--, therefor.

Column 11, line 49; please delete "$R_o$," and insert --$R_o$--, therefor.

Column 11, lines 63-64; please delete "trimethylcycro" and insert --trimethylcyclo--, therefor.

Column 11, line 66; please delete "triethylpenthyl" and insert --triethylpentyl--, therefor.

Column 12, line 23; please delete "tridecylmethl" and insert --tridecylmethyl--, therefor.

Column 12, line 24; please delete "glycidiyl" and insert --glycidyl--, therefor.

Column 12, line 39; please delete "pentylam monium" and insert --pentylammoniun--, therefor.

Column 13, line 8; please delete "traoctyl" and insert --tetraoctyl--, therefor.

Column 13, lines 8-9; please delete "tranonyl" and insert --tetranonyl--, therefor.

Signed and Sealed this
Second Day of August, 2011

David J. Kappos
*Director of the United States Patent and Trademark Office*

Column 13, line 18; please delete "triocyl" and insert --trioctyl--, therefor.

Column 13, line 29; please delete "trimethylpenthyl" and insert --trimethylpentyl--, therefor.

Column 13, line 33; please delete "trimethylcycro" and insert --trimethylcyclo--, therefor.

Column 13, line 35; please delete "triethylpenthyl" and insert --triethylpentyl--, therefor.

Column 13, line 60; please delete "tridecylmethl" and insert --tridecylmethyl--, therefor.

Column 13, line 60; please delete "glycidiyl" and insert --glycidyl--, therefor.

Column 14, line 40; please delete "triocyl" and insert --trioctyl--, therefor.

Column 15, line 20; please delete "slufonyl)imide," and insert --sulfonyl)imide,--, therefor.

Column 15, line 23; please delete "slufonyl)imide," and insert --sulfonyl)imide,--, therefor.

Column 15, line 24; please delete "slufonyl)imide," and insert --sulfonyl)imide,--, therefor.

Column 15, line 39; please delete "slufonyl)imide," and insert --sulfonyl)imide,--, therefor.

Column 15, line 45; please delete "slufonyl)" and insert --sulfonyl)--, therefor.

Column 15, line 64; please delete "slufonyl)" and insert --sulfonyl)--, therefor.

Column 16, line 3; please delete "slufonyl)imide," and insert --sulfonyl)imide,--, therefor.

Column 16, line 22; please delete "slufonyl)imide," and insert --sulfonyl)imide,--, therefor.

Column 16, line 28; please delete "slufonyl)imide," and insert --sulfonyl)imide,--, therefor.

Column 16, line 47; please delete "slufonyl)imide," and insert --sulfonyl)imide,--, therefor.

Column 16, line 53; please delete "slufonyl)imide," and insert --sulfonyl)imide,--, therefor.

Column 17, line 22; please delete "pyrazorium" and insert --pyrazolium--, therefor.

Column 17, line 23; please delete "pyrazorium" and insert --pyrazolium--, therefor.

Column 17, line 25; please delete "zorium" and insert --zolium--, therefor.

Column 17, line 26; please delete "trifluoromethanesulfornate," and insert --trifluoromethanesulfonate,--, therefor.

Column 20, line 8; please delete "Ag," and insert --Ag--, therefor.

Column 20, line 67; please delete "(meth)acrly" and insert --(meth)acryl--, therefor.

Column 21, line 2; please delete "melanine-based" and insert --malamine-based--, therefor.

Column 22, line 63; please delete "dibenzsuberone" and insert --dibenzosuberone--, therefor.

Column 23, line 8; please delete "initiatior" and insert --initiator--, therefor.

Column 23, line 62; please delete "andecylene" and insert --undecylene--, therefor.

Column 25, line 7; please delete "ethylene-propylene" and insert --ethylene•propylene--, therefor.

Column 25, line 8; please delete "ethylene 1-butene" and insert --ethylene•1-butene--, therefor.

Column 25, lines 8-9; please delete "ethylene-vinyl" and insert --ethylene•vinyl--, therefor.

Column 25, line 9; please delete "ethylene-ethyl" and insert --ethylene•ethyl--, therefor.

Column 25, line 10; please delete "ethylene-vinyl" and insert --ethylene•vinyl--, therefor.

Column 29, line 15; After "acrylate" please delete "25".

Column 29, line 22; After "flask" please delete "30".